United States Patent
Yamada

(10) Patent No.: US 10,572,503 B2
(45) Date of Patent: *Feb. 25, 2020

(54) DATABASE SYSTEM, INFORMATION PROCESSING DEVICE, METHOD AND MEDIUM

(71) Applicant: MURAKUMO CORPORATION, Tokyo (JP)

(72) Inventor: Hiroyuki Yamada, Tokyo (JP)

(73) Assignee: MURAKUMO CORPORATION, Tokyo (JP)

( * ) Notice: Subject to any disclaimer, the term of this patent is extended or adjusted under 35 U.S.C. 154(b) by 512 days.

This patent is subject to a terminal disclaimer.

(21) Appl. No.: 15/274,365

(22) Filed: Sep. 23, 2016

(65) Prior Publication Data

US 2017/0011110 A1 Jan. 12, 2017

Related U.S. Application Data

(63) Continuation of application No. PCT/JP2014/058381, filed on Mar. 25, 2014.

(51) Int. Cl.
*G06F 16/27* (2019.01)
*G06F 16/84* (2019.01)
*G06F 16/23* (2019.01)

(52) U.S. Cl.
CPC .......... *G06F 16/27* (2019.01); *G06F 16/2358* (2019.01); *G06F 16/86* (2019.01)

(58) Field of Classification Search
CPC .. G06F 16/2365; G06F 16/1767; G06F 16/27; G06F 16/2358; G06F 16/2379; G06F 16/273
See application file for complete search history.

(56) References Cited

U.S. PATENT DOCUMENTS

| 5,353,410 A | 10/1994 | Macon, Jr. et al. |
| 2006/0010309 A1 | 1/2006 | Chaudhry et al. |

(Continued)

FOREIGN PATENT DOCUMENTS

| EP | 2410431 A1 | 1/2012 |
| JP | 10-187520 A | 7/1998 |

(Continued)

OTHER PUBLICATIONS

International Search Report dated Jul. 8, 2014, issued in counterpart International Application No. PCT/JP2014/058381 (1 page).

(Continued)

*Primary Examiner* — Boris Gorney
*Assistant Examiner* — Bao G Tran
(74) *Attorney, Agent, or Firm* — Westerman, Hattori, Daniels & Adrian, LLP; John P. Kong

(57) ABSTRACT

Provided is a database system, wherein a first node holds a transaction log of a database together with identification information enabling identification of a sequence of commands, transmits specific identification information indicating a transaction log at a predetermined time point, and the transaction log and identification information from after the predetermined time point, to a second node, and transmits data in the database to the second node from the predetermined time point onwards, and when the data received from the first node has been loaded into a memory, the second node executes a command relating to a transaction log which is newer than the transaction log indicated by the specific identification information, on the loaded data.

13 Claims, 12 Drawing Sheets

(56) References Cited

U.S. PATENT DOCUMENTS

| | | | |
|---|---|---|---|
| 2007/0271313 A1 | 11/2007 | Mizuno et al. | |
| 2008/0126833 A1 | 5/2008 | Callaway et al. | |
| 2010/0250491 A1 | 9/2010 | Jin et al. | |
| 2011/0093440 A1 | 4/2011 | Asakura et al. | |
| 2011/0178984 A1 | 7/2011 | Talius et al. | |
| 2012/0011098 A1* | 1/2012 | Yamada | G06F 11/1443 707/623 |
| 2012/0109895 A1 | 5/2012 | Zwilling et al. | |
| 2012/0109919 A1 | 5/2012 | Park et al. | |
| 2013/0006930 A1* | 1/2013 | Taniguchi | G06F 17/30578 707/625 |
| 2013/0067033 A1 | 3/2013 | Wu | |

FOREIGN PATENT DOCUMENTS

| | | |
|---|---|---|
| JP | 2004-280337 A | 10/2004 |
| JP | 2007264685 A | 10/2007 |
| JP | 2007-310701 A | 11/2007 |
| JP | 2012-133417 A | 7/2012 |
| JP | 2012-532376 A | 12/2012 |
| JP | 2013-506892 A | 2/2013 |

OTHER PUBLICATIONS

"Readers-writer lock", Wikipedia, The Free Encyclopedia, Nov. 12, 2012; cited in Extended (supplementary) European Search Report. (3 pages).

Extended (supplementary) European Search Report dated May 23, 2016, issued in counterpart European Application No. 12890487.7. (13 pages).

International Search Report dated Feb. 26, 2013, issued in International Application No. PCT/JP2012/083289, with English translation. (5 pages).

Office Action dated Jul. 18, 2017, issued in counterpart Japanese Application No. 2016-509681, with English translation (6 pages).

Extended (supplementary) European Search Report dated Oct. 20, 2017, issued in counterpart application No. 14886733.6. (10 pages).

Extended (supplementary) European Search Report dated Nov. 8, 2017 issued in counterpart application No. 14887142.9. (8 pages).

Non-Final Office Action dated Dec. 6, 2017, issued in U.S. Appl. No. 14/744,877 (21 pages).

International Search Report dated Feb. 26, 2016, issued in International Application No. PCT/JP2012/083289, with English translation. (5 pages).

\* cited by examiner

DATABASE SYSTEM, INFORMATION PROCESSING DEVICE, METHOD AND MEDIUM

CROSS-REFERENCE TO RELATED APPLICATION

This application is a continuation application of International Application PCT/JP2014/058381 filed on Mar. 25, 2014 and designated the U.S., the entire contents of which are incorporated herein by reference.

FIELD

The present disclosure relates to technology for managing a database.

BACKGROUND

Conventionally, a database management system has been proposed, wherein a transaction log transmitted from another server node is received in preparation for a fault in the system, and the received transaction log is reflected in the database (see Japanese Translation of PCT Application No. 2012-532376).

Furthermore, technology has been proposed in which a master creates a plurality of transaction logs in parallel, the plurality of transaction logs created in parallel is transmitted to another master or slave, and the other master or slave applies the plurality of transaction logs to the database in parallel (see Japanese Patent Application Publication No. 2012-133417).

SUMMARY

Conventionally, in a database system in which log base replication is carried out, various methods have been proposed for configuring a database in the replication destination. For example, among the proposed methods are: (1) a method for copying data after stopping the nodes; (2) a method for temporarily copying a whole table from a replication source node to a replication destination node, and after copying, extracting and reflecting the difference that occurs during copying, in the replication source node; and (3) a method for creating a check point in the replication source node, saving a snap shot and copying the snap shot to the replication destination node, and then reflecting the transaction log from the check point onwards in the replication destination node.

However, in method (1) for copying data after stopping the node, it is not possible to use the database until the data copying has ended. Furthermore, in method (2) which extracts and reflects the difference after copying, a large amount of resources is required in order to extract and reflect the difference. Moreover, in method (3) which reflects the transaction log from the check point onwards in the replication destination node, a large amount of resources is required for the processing of creating a check point and saving a snap shot in a storage device of the replication source node, and the processing of reflecting the transaction log in the replication destination node.

The present disclosure was devised in view of the problems described above, an object thereof being to reduce the resources required until a replication destination node becomes able to provide services, in a database system.

The present disclosure adopts the following measures in order to resolve the problems described above. More specifically, the present disclosure is a database system having a plurality of nodes, wherein a first node which is a replication source of a database, among the plurality of nodes, comprises: log holding means for holding a transaction log of a database managed by the first node, together with identification information enabling identification of a sequence of commands relating to the transaction log; specific identification information transmission means for transmitting specific identification information indicating a transaction log at a predetermined time point, from among the identification information items held by the log holding means, to a second node which is a replication destination of the database among the plurality of nodes; log transmission means for transmitting, to the second node, the transaction log and the identification information from at least after the predetermined time point, in association with each other; and data transmission means for transmitting data managed by the database to the second node, from the predetermined time point onwards, and the second node comprises: reception means for receiving the transaction log, the identification information of the transaction log, the specific identification information and the data, from the first node; and execution means for, when the received data has been expanded (loaded) into a memory of the second node and is in a state available for data search or processing, executing a command relating to a transaction log, of the received transaction logs, which is at least newer than the transaction log indicated by the specific identification information, on the data that has been expanded into the memory.

In the database system relating to the present disclosure, the first node transmits specific identification information indicating a transaction log at a predetermined time point, the transaction log from the predetermined time point onwards, and the data from the predetermined time point onwards, to the second node. The second node, if the received data has been expanded into a memory and is in a state available for searching, etc. (for example, if the page containing the data is "cached"), executes a command relating to the transaction log from the predetermined time point onwards, on the data (cache) expanded into the memory. In other words, in the present disclosure, it is presumed that the received data is expanded into a memory before becoming available for use in searching, etc., and the execution of the commands relating to the transaction log (reflection of the transaction log) is delayed until expansion of the data into the memory. In other words, according to the present disclosure, the provision of services by the second node can be started without waiting for reflection of the transaction log. The data is transmitted and received in table units or page units.

Furthermore, the data transmission means may transmit the data respectively in predetermined management units divided in such a manner that records having an interdependent sequence of commands relating to the transaction logs are included in the same management unit; and the execution means may execute a command relating to the transaction log, for each of the predetermined management units.

Furthermore, the database system may further comprise map generation means for generating a map indicating a relationship between the predetermined management unit containing data that is an object of a command, and the contents of the command, on the basis of the transaction log, of the received transaction logs, which is at least newer than the transaction log indicated by the specific identification information; and the execution means may execute a command relating to the transaction log, for each of the predetermined management units, by referring to the map.

Moreover, the database system may further comprise map generation means for generating a map indicating a relationship between the data that is an object of a command, and the contents of the command, on the basis of the transaction log, of the received transaction logs, which is at least newer than the transaction log indicated by the specific identification information; and the execution means may execute a command relating to the transaction log, on the data that is the object of the command, by referring to the map.

Furthermore, the data transmission means may transmit data which has been expanded into a memory of the first node and is in a state available for data search or processing, to the second node.

Moreover, the second node may further comprise request transmission means for transmitting, to the first node, a transmission request by specifying data in the database; the first node may further comprise request reception means for receiving, from the second node, a transmission request for data managed by the first node; the specific identification information transmission means may transmit, to the second node, the specific identification information relating to the requested data, in accordance with the transmission request; and the data transmission means may transmit the requested data to the second node, in accordance with the transmission request.

Furthermore, the second node may further comprise: search request reception means for receiving a search request from a user terminal; and search response means for sending back, to the user terminal, a response to the search request; the request transmission means may transmit, to the first node, at least a transmission request for data relating to the search request, in accordance with the search request; the execution means may expand the data that has been transmitted from the first node and received by the reception means in accordance with the transmission request, into the memory, and execute a command relating to the transaction log on the data; and the search response means may send back, to the user terminal, the response to the search request, on the basis of the data which has been acquired from the first node as a result of the search request and on which the command relating to the transaction log has been executed.

Furthermore, the second node may further comprise: search request reception means for receiving a search request from a user terminal; and search response means for sending back, to the user terminal, a response to the search request; the execution means may expand the data that has been received by the reception means in accordance with the transmission request, into the memory, and execute a command relating to the transaction log on the data; and the search response means may send back, to the user terminal, the response to the search request, on the basis of the data on which the command relating to the transaction log has been executed in accordance with the search request.

Furthermore, the data transmission may transmit, to the second node, management information of the database; and the request transmission means may refer to the management information and transmit a transmission request to the first node by specifying data in the database.

Furthermore, the second node may further comprise expansion means for expanding the data received from the first node directly into the memory such that the data is available for data search or processing; and the execution means may, in response to the fact that the received data has been expanded into the memory by the expansion means, execute a command relating to the transaction log on the data.

Furthermore, the specific identification information transmission means may transmit, as the specific identification information, identification information indicating the newest transaction log from among the identification information items held by the log holding means.

Moreover, the execution means may execute a command relating to the transaction log on the received data, in accordance with the sequence of commands identified from the identification information.

The present disclosure can be understood as a computer system, an information processing device, a method executed by a computer, or a program which is executed in a computer. Furthermore, the present disclosure can also be understood as a recording medium on which such a program is recorded so as to be readable by a computer, or other device or machine, or the like. Here, a recording medium which is readable by a computer, or the like, is a recording medium on which information, such as data or programs, is stored by an electrical, magnetic, optical, mechanical or chemical action, and which can be read by the computer, or the like.

According to the present disclosure, in a database system, it is possible to reduce the resources required until a replication destination node becomes able to provide services.

DESCRIPTION OF EMBODIMENTS

Below, embodiments of the system, information processing device and the method and program relating to the present disclosure are described below on the basis of the drawings. However, the embodiments given below are merely examples and the system, information processing device and the method and program relating to the present disclosure are not limited to the specific configuration given below. In implementing the disclosure, the concrete configurations corresponding to the embodiments can be adopted, as appropriate, and various improvements and modifications can be made.

In the present embodiment, the system, information processing device, method and program of the present disclosure are described as an embodiment which is implemented in a recordable database system. A recordable database system is a database system of a type which updates data by additionally writing new data, rather than writing new data over old data, when updating data. The system, information processing device, method and program according to the present disclosure can be applied widely to technology for using data managed by one node, in another node, in a system which has a plurality of nodes, and the object of application of the present disclosure is not limited to the example stated in the present embodiment.

First Embodiment

Figure 1:
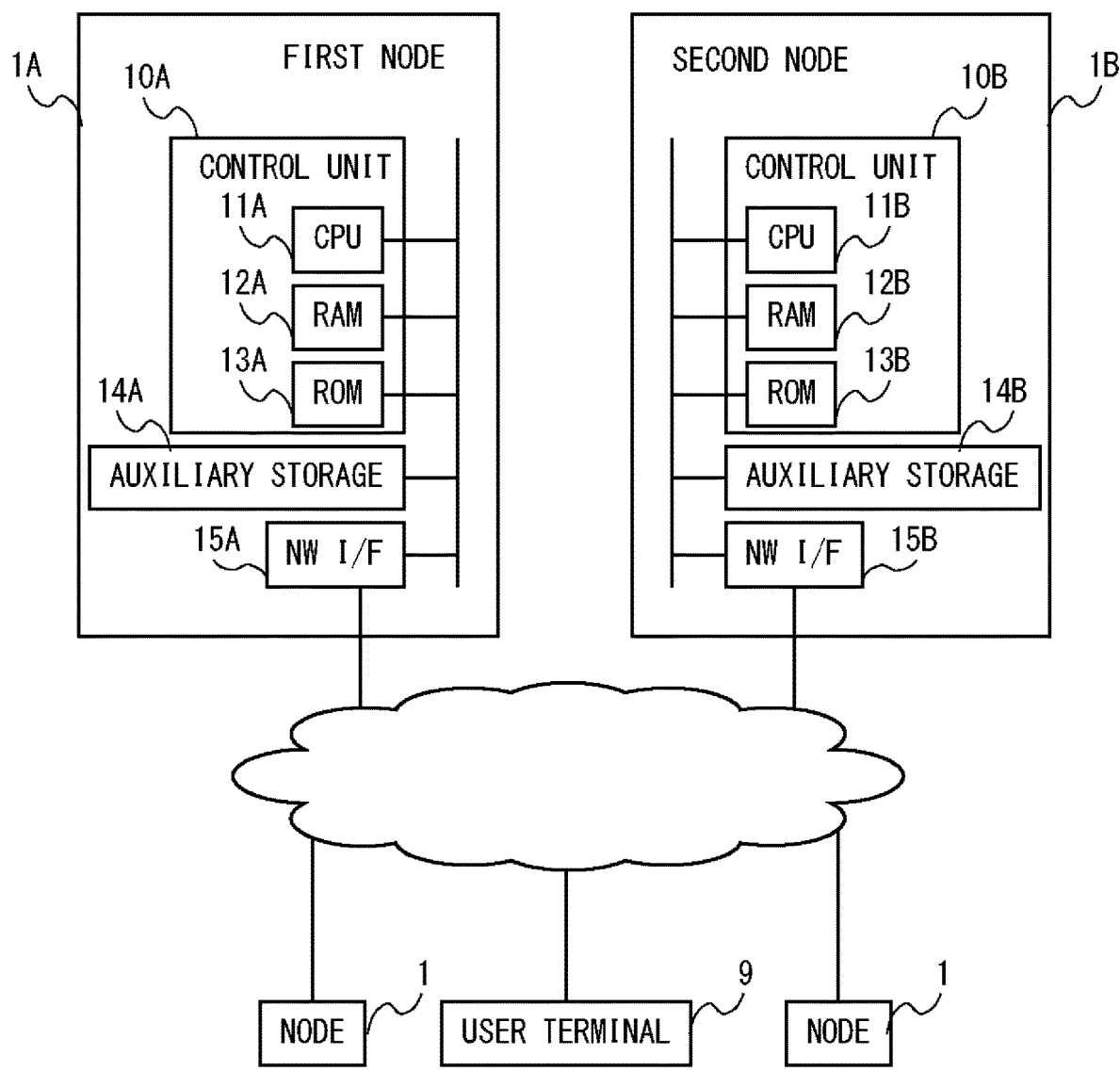
FIG. 1 is a drawing showing a schematic view of a hardware configuration of a system relating to an embodiment of the disclosure.

Firstly, a first embodiment is described.
<<System Configuration>>
FIG. 1 is a drawing showing a schematic view of a hardware configuration of a system relating to the present embodiment. The system according to the present embodiment is provided with a plurality of nodes (information processing devices) 1 for responding to a search request (query) from a user terminal 9. The plurality of nodes 1 are connected in mutually communicable manner via a network. One node 1 on which a database has already been constructed, of the plurality of nodes 1, can be set as a first node 1A which has an original database in the present embodiment. Furthermore, a second node 1B which receives data from the first node 1A in the present embodiment is a node in which database software has been installed, but the contents of the database have not been constructed. The present embodiment describes technology for providing content (data) of a database managed by the first node 1A, for use in a search in the second node 1B, in a system of this kind. In the present embodiment, when describing a node in general without differentiating the nodes, the term "node 1" is used, and when the nodes are to be differentiated, the suffixes such as "first node 1A" and "second node 1B" are used.

The system relating to the present disclosure can be applied to a database system having a hierarchical structure and/or a multi-master database system, but in this case, either a master node or slave node in the database system can be designated as the first node 1A or the second node 1B.

The first node 1A and the second node 1B are computers having control units 10A, 10B comprising central processing units (CPUs) 11A, 11B, random access memories (RAMs) 12A, 12B, and read only memories (ROMs) 13A, 13B, etc., auxiliary storage devices 14A, 14B, and communication interfaces 15A, 15B. The specific hardware configuration of the nodes 1 can be subjected to omissions, substitutions and additions, as appropriate, in accordance with the embodiment. Furthermore, the nodes 1 are not limited to being a single device. The nodes 1 may be achieved by a plurality of devices using so-called cloud or distributed computing technology, etc.

In the present embodiment, the records of the database are managed in page units, and data is exchanged in page units between the storage device (for example, the auxiliary storage devices 14A, 14B) and memory, etc. (for example, RAMs 12A, 12B). Here, data that has been expanded (loaded) into the memory, etc. and is in a state available for data search or processing is called a cache. On the other hand, data in a storage device is in a state that is not available for data search or processing. In other words, when the contents of the database are the object of processing such as a search or update, etc., then the node reads out the page including the object record from the storage and caches the page, and carries out processing relating to the object record. Furthermore, after an object record has been updated, an updated database is saved by writing the page of the cache including the record, to a storage device. The timing for writing the page to the storage device is determined, as appropriate, in accordance with the embodiment. One record or a plurality of records are stored in a page. Furthermore, the page may also be called a block, which corresponds to the "predetermined management unit" of the present disclosure.

In the present embodiment, data is requested in page units and data is transmitted and received in page units, in the transmission and reception processing between nodes which is described below. Carrying out the reading/writing and transmission/reception of data in page units is one example of a specific configuration which can be applied when implementing the present disclosure, and the technical scope of the present disclosure is not limited to reading/writing and transmission/reception of data in page units. The reading/writing and transmission/reception of data may be carried out in table units, for example, or may be carried out in other management units.

Figure 2:
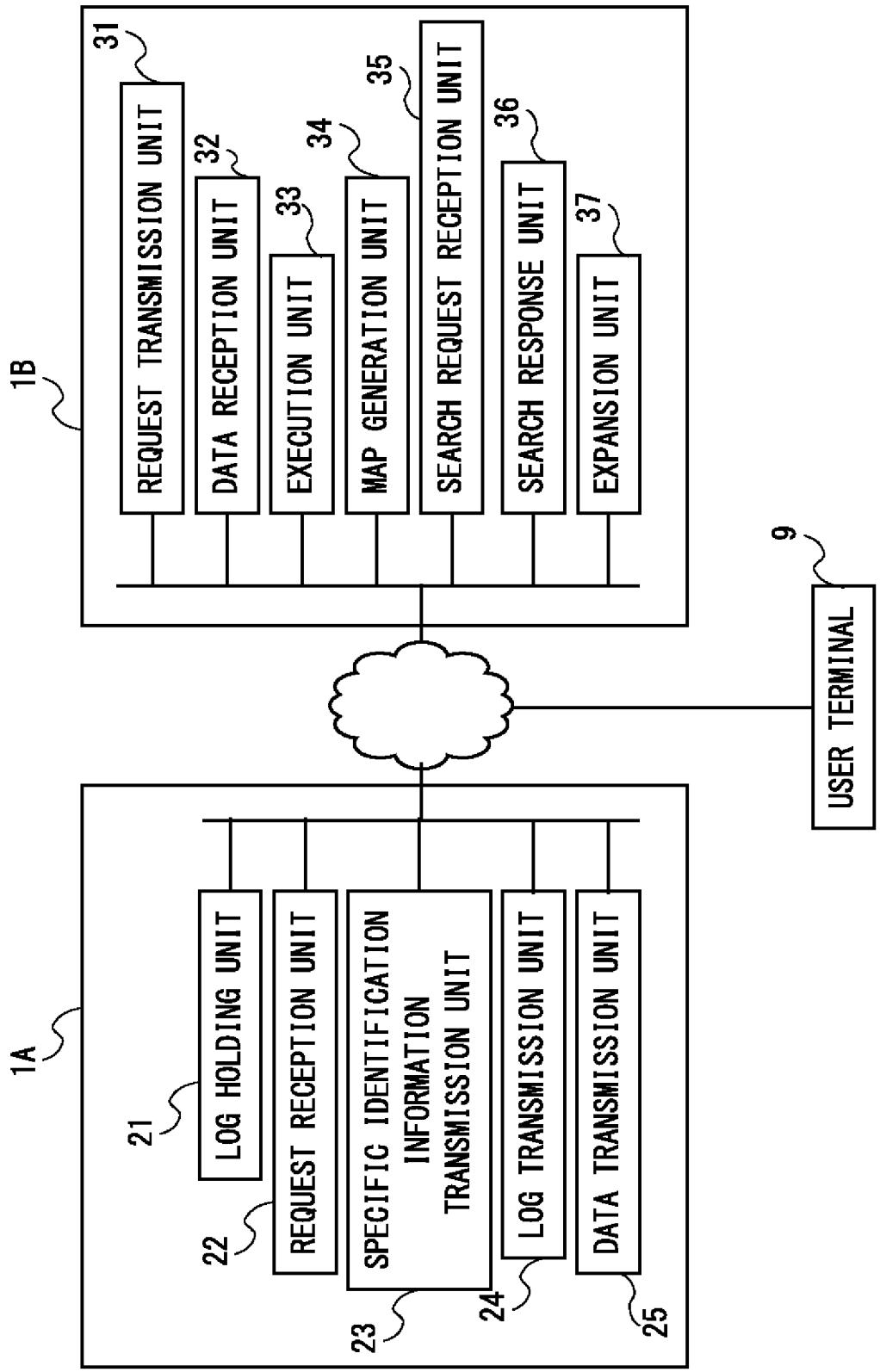
FIG. 2 is a schematic drawing of the functional configuration of a system relating to an embodiment of the disclosure.

FIG. 2 is a diagram showing a schematic view of the functional configuration of the first node 1A and the second node 1B relating to the present embodiment. In the first node 1A relating to the present embodiment, the CPU 11A interprets and executes various programs which have been expanded into the RAM 12A, and by controlling various hardware provided in the node 1A, the CPU 11A functions as a computer provided with a log holding unit 21, a request reception unit 22, a specific identification information transmission unit 23, a log transmission unit 24 and a data transmission unit 25. In the present embodiment, an example is described in which the functions of the first node 1A are executed by a generic CPU 11A, but all or a portion of these functions may also be achieved by one or a plurality of dedicated processors.

The log holding unit 21 holds a transaction log in a database managed by the first node 1A (called "transaction log" below), together with a log sequence number (LSN) which is identification information that enables identification of the chronological sequence of the commands included in the transaction log. The commands include an update command relating to the updating of the database, and a management command relating to the management of transactions. Furthermore, the transaction log is created each time a transaction occurs in a node, and an LSN is applied to the log which is held in the log holding unit 21.

The request reception unit 22 receives a transmission request for data managed by the first node 1A, which is transmitted by the second node 1B.

The specific identification information transmission unit 23 transmits specific identification information (specific LSN) indicating the transaction log at a predetermined time point, of the LSNs held by the log holding unit 21, to the second node 1B, in accordance with the data transmission request received by the request reception unit 22. The specific LSN transmitted here may be determined for each requested page. In the present embodiment, the specific identification information transmission unit 23 transmits an LSN indicating the newest transaction log, as the specific LSN. By setting the specific LSN to the LSN indicating the newest transaction log, the volume of the transaction log that is to be transmitted by the log transmission unit 24 is reduced, and the volume of the transaction log to be reflected in the second node 1B can be reduced. The transmitted specific LSN only has to indicate the transaction log at a predetermined time point, in order to determine the transaction log to be reflected in the second node 1B, and is not limited to the LSN indicating the newest transaction log.

The log transmission unit 24 transmits, to the second node 1B, at least the transaction log and the LSN after the predetermined time point indicated by the specific LSN, in association with each other. After starting the transmission of the transaction logs, the log transmission unit 24 also transmits newly generated transaction logs, successively, to the second node 1B.

The data transmission unit 25 transmits, to the second node 1B, a page relating to the request, of the pages managed by the database in accordance with a data transmission request received by the request reception unit 22, the page reflecting at least the contents up to a predetermined time point relating to the specific LSN. In the present embodiment, the data transmission unit 25 transmits data respectively in predetermined management units (in the present embodiment, pages) divided in such a manner that records having an interdependent sequence of update commands based on the transaction logs are included in the same management unit.

In the present embodiment, the data transmission unit 25 transmits data in a state which is available for data search or processing, by being expanded into a memory of the first node 1A, in other words, a cache, to the second node 1B. If there is no cache of the page that is the transmission object, when transmitting data, the first node 1A reads out the object page from the storage device and caches the page. This is because, in the database system according to the present embodiment, updating of the data generated by the respective nodes 1 is reflected immediately in the cache and the cache represents the newest state of the data, and therefore by using the cache as the data that is to be transmitted to the second node 1B, the transmitted data can be configured as a page which reflects the data contents up to the predetermined time point relating to the specific LSN, which is the LSN indicating the newest transaction log.

The transmitted data may be data that reflects at least the contents up to the predetermined time point relating to the specific LSN, and is not limited to the cache that is used in the present embodiment. If it can be guaranteed that the database system to which the present disclosure is applied reflects at least the contents up to a predetermined time point relating to the specific LSN, in the data in the storage device, then the data read out from the storage device may be transmitted directly without alteration.

Furthermore, in the second node 1B relating to the present embodiment, the CPU 11B interprets and executes various programs which have been developed in the RAM 12B, and by controlling various hardware provided in the node 1B, the CPU 11B functions as a computer provided with a request transmission unit 31, a data reception unit 32, an execution unit 33, a map generation unit 34, a search request reception unit 35, a search response unit 36 and an expansion unit 37. In the present embodiment, an example is described in which the functions of the second node 1B are executed by a generic CPU 11B, but all or a portion of these functions may also be achieved by one or a plurality of dedicated processors.

The request transmission unit 31 transmits a data transmission request to the first node 1A by specifying data in the database. In the present embodiment, the specification of the data is carried out in page units.

The data reception unit 32 receives, from the first node 1A, the transaction log, the LSN of the transaction log, and the specific LSN and data for each page. As described above, in the present embodiment, the transmission and reception of data is carried out in page units.

When the data transmitted from the first node 1A and received by the data reception unit 32 in accordance with the data transmission request is expanded into a memory of the second node 1B and is in a state available for data search or processing (cache), then the execution unit 33 executes, on the data that has been expanded into the memory, an update command included in a transaction log, of the received transaction logs, which is at least newer than the transaction log relating to the specific LSN. Here, the update command included in the transaction log is executed in accordance with the sequence identified from the LSN.

The map generation unit 34 generates a map indicating the relationship between the page containing the data that is the object of the update command included in the transaction log, and the update command, on the basis of a transaction log, of the received transaction logs, which is at least newer than the transaction log indicated by the specific LSN.

As described above, in the present embodiment, since the data is managed in pages, the map generation unit 34 generates a map indicating the relationship between the update command and the page containing the data that is the object of the update command, but the map generation means may generate a map indicating the relationship between another management unit (for example, a table, etc.) and the update command. Furthermore, the map generation means may generate a map indicating the relationship between an update command, and the record that is the object of the update command, without using a management unit of this kind.

The search request reception unit 35 receives a search request (query) from the user terminal 9.

The search response unit 36 sends back a response to the search request (query), to the user terminal 9, on the basis of the data which is acquired from the first node 1A and which reflects the update command based on the transaction log.

The expansion unit 37 expands the data received from the first node 1A, into the memory, making the data available for data search or processing. In the present embodiment, the expansion unit 37 reads out the data received from the first node 1A to the memory to create a cache, in response to a query and/or requirement in update execution processing.

<<Flow of Processing>>

Next, the details of the processing relating to the present embodiment will be described. The specific content and sequence, etc. of the processing described in the present embodiment is one example of the implementation. The specific content and sequence of the processing, etc. may be selected, as appropriate, in accordance with the mode of implementing the present disclosure.

Figure 3:
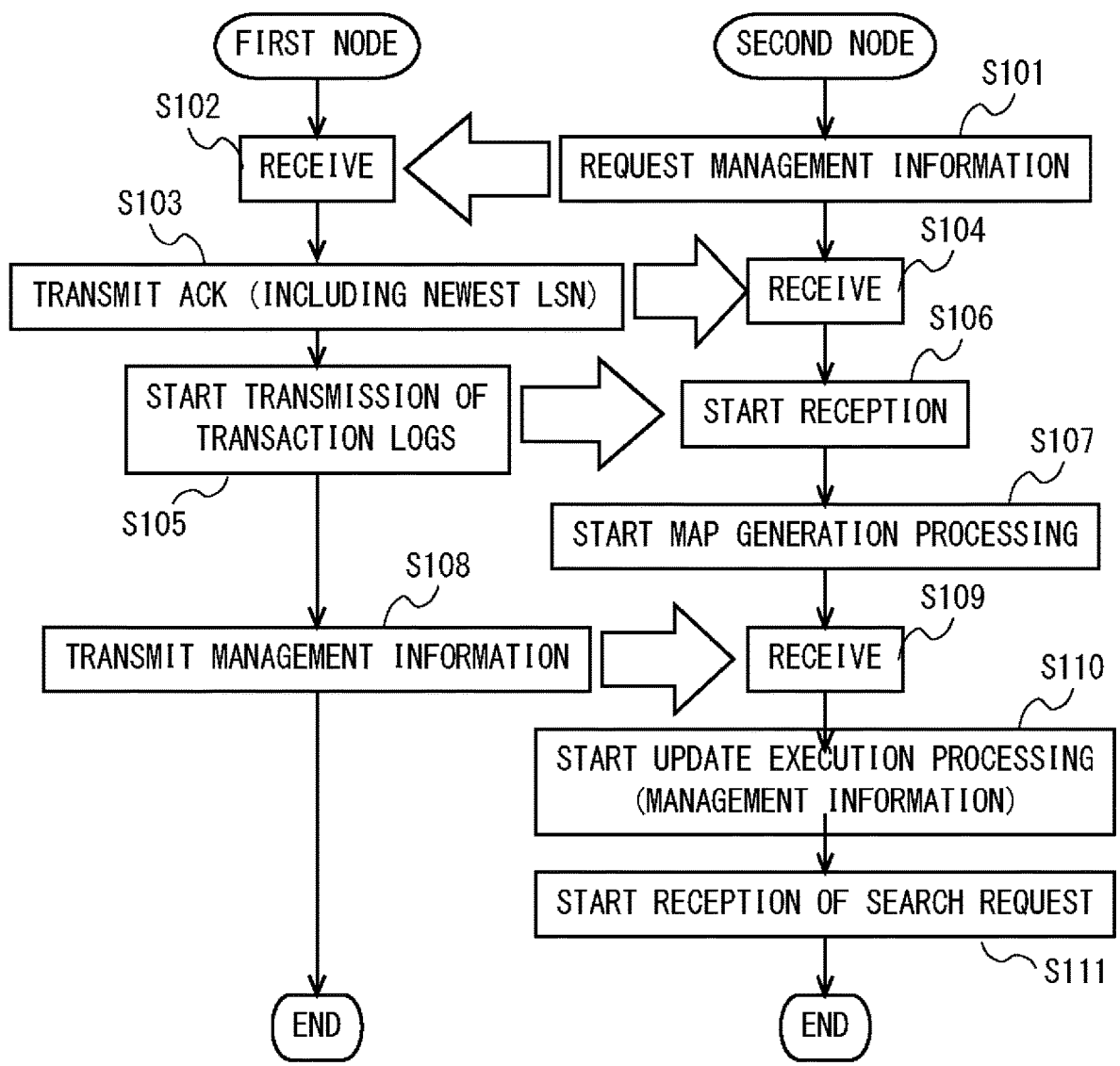
FIG. 3 shows a flowchart illustrating a flow of management information transmission and reception processing which is executed by a first node and a second node in an embodiment of the disclosure.

FIG. 3 shows a flowchart illustrating a flow of management information transmission and reception processing which is executed by the first node 1A and the second node 1B in the present embodiment. The processing shown in the flowchart is started upon the occasion of the second node 1B receiving an instruction to start construction of a database.

In step S101 and step S102, a management information request is transmitted and received. The request transmission unit 31 transmits a data transmission request by specifying management information (system catalogue, etc.) of the database, to the first node 1A (step S101). Here, the management information includes information that enables identification of the position of a table and/or record in the database. The database relating to the present embodiment is managed in page units, and therefore the management information includes information that enables identification of the relationship between the table and the page in the database. Furthermore, in the present embodiment, the reading/writing and transmission/reception of the management information are carried out in page units, similarly to other tables. The management information may be requested in accordance with other units, such as table units, etc., similarly to the reading/writing and transmission/reception of data described above. The request reception unit 22 receives a request transmitted by the second node 1B (step S102). Thereupon, the processing advances to step S103.

In step S103 and step S104, a response (acknowledgement, called "ACK" below) to the data transmission request is transmitted and received. This ACK includes a specific LSN of the management information. As described above, the LSN is identification information that enables identification of the sequence of commands (update commands) included in the transaction logs, and the specific LSN is an LSN that indicates the transaction log at a predetermined time point (the newest transaction log in the present embodiment), of the LSNs held by the log holding unit 21. In other words, the specific identification information transmission unit 23 transmits, to the second node 1B, an ACK including a specific LSN relating to the requested management information, of the LSNs held by the log holding unit 21 (step S103). The data reception unit 32 receives an ACK including the specific LSN, from the first node 1A (step S104). Thereupon, the processing advances to step S105.

In step S105 and step S106, transmission and reception of the transaction logs is started. The log transmission unit 24 transmits, to the second node 1B, the transaction logs and LSN after a predetermined time point, in association with each other (step S105). Thereafter, the transaction logs generated in the first node 1A are transmitted successively to the second node 1B, in continuous fashion. Here, the "predetermined time point" is the point in time at which the transaction log indicated by the specific LSN transmitted in step S103 is generated. The data reception unit 32 starts reception of the transaction logs and the LSN relating to the transaction logs, which are transmitted by the first node 1A (step S106).

After starting transmission and reception of the logs, the transaction logs generated newly in the first node 1A are transmitted to the second node 1B, as the logs are generated, and are received by the second node 1B. In other words, after starting the transmission of the logs, the second node 1B receives all of the transaction logs from the predetermined time point on. Thereupon, the processing advances to step S107.

As described above, the processing sequence is not limited to the example shown in the flowchart. In the management information transmission and reception processing, all of the transaction logs from the time point indicated by the specific LSN, of the transaction logs relating to the object page, may be received by the second node 1B. Consequently, for example, the processing sequence of the transmission and reception processing in step S103 and step S104, and the transmission and reception processing in step S105 and step S106, may be interchanged.

In step S107, the map generation processing is started in respect of the management information. The map generation unit 34 sets, as the object of the map generation processing, a page relating to the management information. In other words, from the present step onwards, processing is started for generating a map which links combinations of an update command which is executed in respect of the management information and the execution object of the update command (object page, object table or object record, etc.). The map generation processing is executed in parallel with the processing shown in the present flowchart. The details of the map generation processing are described with reference to FIG. 5. Thereupon, the processing advances to step S108.

In step S108 and step S109, management information of the database is transmitted and received. The data transmission unit 25 receives the request received in step S102, and transmits the database management information (system catalogue, etc.) to the second node 1B (step S108). In this case, the data transmission unit 25 transmits the cache of data that is the transmission object to the second node 1B. In the course of this transmission, if there is no cache of the data that is the transmission object, then the first node 1A reads out the object data from the storage device and caches the data, and makes the data reflect at least the contents up to the predetermined time point relating to the specific LSN, and then transmits the data to the second node 1B. The data reception unit 32 in the second node 1B receives the management information from the first node 1A (step S109). Thereupon, the processing advances to step S110.

In the present flowchart, the transmission of management information (step S108) is described after the start of map generation (step S107), but the management information at or after the predetermined time point relating to the specific LSN may be transmitted, and the transmission timing is not limited to the example shown in the present flowchart.

In step S110, update execution processing is started. The execution unit 33 sets the page relating to management information as the object of the update execution processing. In other words, an update command which has been recorded in the management information after the present step and has not yet been reflected in the management information is executed. The update execution processing is executed in parallel with the processing shown in the present flowchart. The details of the update execution processing are described with reference to FIG. 6. Thereupon, the processing advances to step S111.

In step S111, the reception of a search request (query) is started. By starting the search request response processing, the second node 1B starts the reception of a query that is transmitted from the user terminal 9. Thereafter, the search request reception unit 35 receives a query from the user terminal 9, and upon receiving the query, the page required in order to respond to the query is acquired by referring to the management information. The search request response processing is executed in parallel with the processing shown in the present flowchart. The details of the search request response processing are described with reference to FIG. 7 and FIG. 8. Subsequently, the processing indicated in the present flowchart is terminated.

In the present embodiment, an example is described in which the replication of the management information is carried out by using map generation processing, update execution processing and search request response processing, similarly to the other tables in the database, but another method may also be used for replicating the management information. For example, the replication of the management information may use a conventional method of creating check points and replicating a snap shot of the check points.

Figure 4:
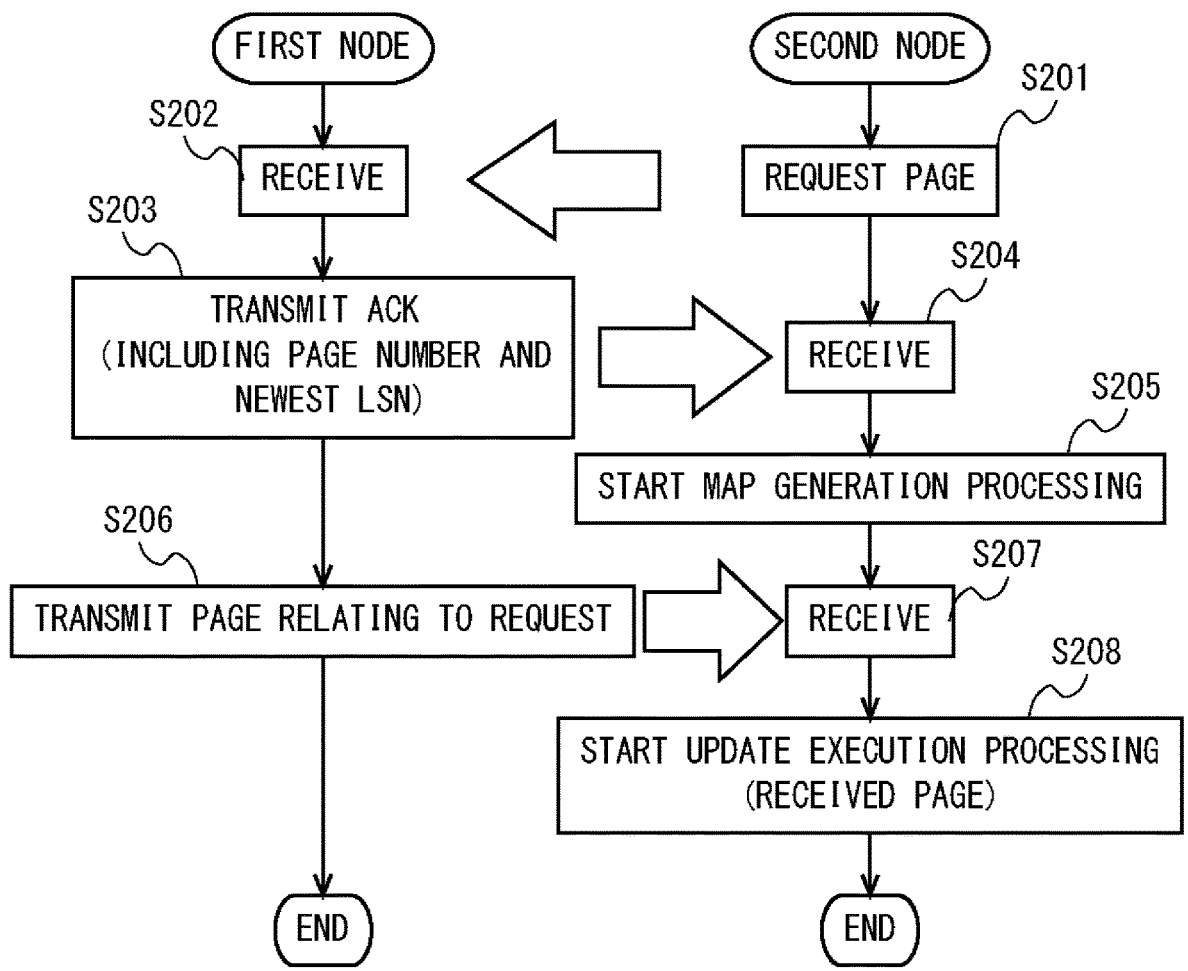
FIG. 4 shows a flowchart illustrating a flow of database transmission and reception processing which is executed by the first node and the second node in an embodiment of the disclosure.

FIG. 4 shows a flowchart illustrating a flow of database transmission and reception processing which is executed by the first node 1A and the second node 1B in the present embodiment. The processing shown in the flowchart is started when it has become possible to identify the page configuration of the database managed by the first node 1A, due to the second node 1B having received database management information from the first node 1A.

In step S201 and step S202, a data transmission request is transmitted and received. The request transmission unit 31 transmits a data transmission request by referring to the cache of management information and specifying a page in the database, to the first node 1A (step S201). A page number, for example, may be used to specify the page. If the page containing the target data is known from the management information, the data transmission request may specify the page, or may specify a particular record in the database. In the present embodiment, data is requested in page units, but as stated previously, the data may be requested in accordance with another unit, such as table units. The request reception unit 22 receives a transmission request for data managed by the first node 1A, from the second node 1B (step S202). Thereupon, the processing advances to step S203.

In step S203 and step S204, an ACK relating to the data transmission request is transmitted and received. This ACK includes a page number and a specific LSN of the page in question. In other words, the specific identification information transmission unit 23 transmits, to the second node 1B, an ACK including a specific LSN relating to the requested page, of the LSNs held by the log holding unit 21 (step S203). The data reception unit 32 receives an ACK including the specific LSN, from the first node 1A (step S204). Thereupon, the processing advances to step S205.

In step S205, map generation processing is started in respect of the page, etc. relating to the request. The map generation unit 34 sets, as the object of the map generation processing, the page requested in step S201. In other words, from the present step onwards, processing is started for generating a map which links combinations of an update command which is executed in respect of the requested page, and the execution object of the update command (object page, object table or object record, etc.). The contents of the map generation processing started here are substantially the same as that started in respect of the management information in step S107 (see FIG. 5), and are carried out in parallel with the processing indicated in the present flowchart. Thereupon, the processing advances to step S206.

In the present embodiment, an example is described in which the map generation start timing differs for each item of management information and/or page (see step S107 and step S205), but the map generation start timing may be simultaneous for the whole database.

In step S206 and step S207, the page relating to the request is transmitted and received. The data transmission unit 25 transmits the requested page, of the pages managed by the database, to the second node 1B, in accordance with the request received in step S201 (step S206). In this case, the data transmission unit 25 transmits the cache of data that is the transmission object, to the second node 1B. In the course of this transmission, if there is no cache of the page that is the transmission object, then the first node 1A reads out the object page from the storage device and caches the page, and makes the page reflect at least the contents up to the predetermined time point relating to the specific LSN, and then transmits the data to the second node 1B. The data reception unit 32 in the second node 1B receives the data from the first node 1A (step S207). The unit of data transmission and reception may be a unit that corresponds to the request, and may be a page unit, table unit or record unit. Thereupon, the processing advances to step S208.

In the present flowchart, the transmission of data (step S206) is described after the start of map generation (step S205), but the data at or after a predetermined time point relating to the specific LSN may be transmitted, and the transmission timing is not limited to the example shown in the present flowchart.

In step S208, update execution processing is started. The execution unit 33 sets the data received in step S207 as the object of the update execution processing. In other words, an update command which has been recorded in the management information after the present step and has not yet been executed is executed. Subsequently, the processing indicated in the present flowchart is terminated.

In the present embodiment, in order for the second node 1B to acquire all of the data in the database of the first node 1A, the database transmission and reception processing shown in FIG. 4 is carried out repeatedly while successively changing the requested page, until the acquisition of all pages indicated in the management information is completed. In other words, by repeating the processing from step S201 to step S208, the request transmission unit 31 transmits a data transmission request in respect of all of the pages or tables identified by referring to the management information. If the second node 1B is not required to acquire all of the data located in the database of the first node 1A, the request transmission unit 31 may carry out a data transmission request in respect of only the portion of pages and/or tables that are required. Furthermore, in the present embodiment, an example is described in which, when acquiring a plurality of pages, the processing from step S201 to step S208 is repeated, but when acquiring a plurality of pages, it is also possible to issue a request for a plurality of pages together, in step S201.

The page received from the first node 1A in the processing indicated in the flowchart may possibly include a transaction log that has not yet been reflected. Therefore, the unreflected transaction log is reflected by carrying out the map generation processing, the update execution processing and the search request response processing (details given below) in parallel with the processing indicated in the present flowchart. The timing at which each processing is started is as described above. The transaction log relating to the page or table pertaining to the request is included in the transaction logs which are received successively from step S105 onwards.

In the present embodiment, the data received from the first node 1A is saved temporarily to a storage device. Instead of processing of this kind, the expansion unit 37 may expand the data received from the first node 1A, directly into the memory without passing via the storage device (in the present embodiment, the auxiliary storage device 14B), thus making the data available for data search or processing. If the reception data is expanded directly into the memory, then an update command relating to that reception data is reflected immediately in accordance with the map generation processing described below.

Next, the flow of the database management processing executed in the second node 1B will be described. In the present embodiment, the database in the second node 1B is managed by map generation processing, update execution processing and search request response processing. The second node 1B is able to carry out the respective processing of map generation, reflecting the mapped update command, and making a search request (query), in parallel, by starting up and executing, in parallel, a plurality of instances for executing the processing, as appropriate.

Figure 5:
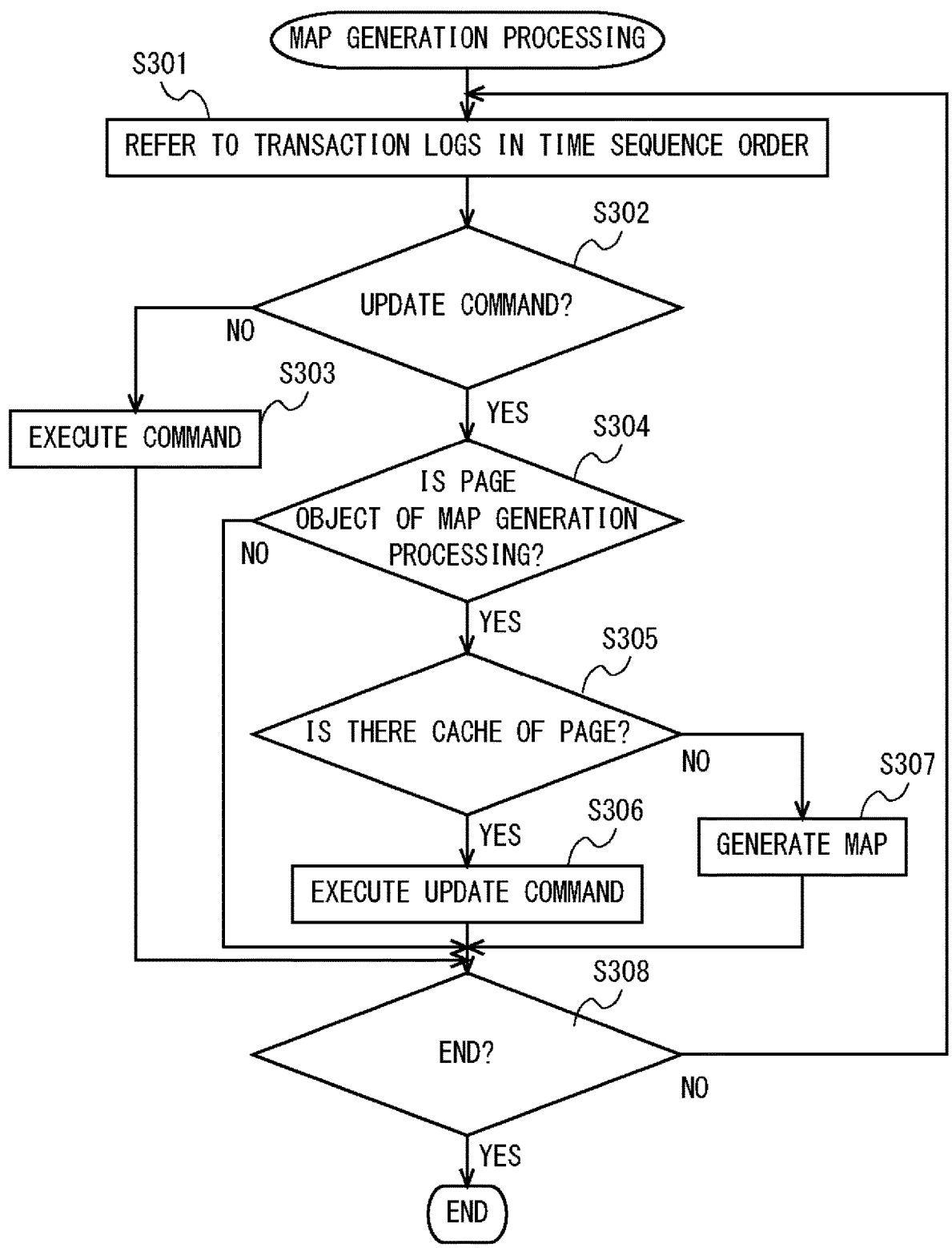
FIG. 5 shows a flowchart illustrating a flow of map generation processing which is executed by the second node in an embodiment of the disclosure.

FIG. 5 shows a flowchart illustrating a flow of map generation processing which is executed by the second node 1B in the present embodiment. The processing illustrated in the flowchart is carried out repeatedly on the data that is the object of the map generation processing (see step S107 and step S205).

In step S301, the commands included in the transaction log are referred to in time sequence, by referring to the LSN. The second node 1B refers to the commands included in the unreflected transaction logs, in sequence from the oldest time point in the time sequence (from the smallest LSN). The transaction logs referred to here are logs of which the transmission/reception starts in the processing in step S105 and step S106, and which are received by the second node 1B. Thereupon, the processing advances to step S302.

In step S302 and step S303, it is determined whether or not the command is an update command, and a command other than an update command is executed. The second node 1B determines whether or not the command referenced in step S301 is an update command (step S302). If the referenced command is a command other than the update command (for example, a management command, such as "commit"), then the command is executed directly (step S303). On the other hand, if it is determined that the referenced command is an update command, then the processing advances to step S304.

In step S304, it is determined whether or not the page indicated by the reference command is an object of the map generation processing. The second node 1B determines whether or not the object data has been set as an object of the map generation processing, in step S107 or step S205, etc. Here, if it is determined that the object data has not been set as an object of the map generation processing, then the processing indicated in the present flowchart is terminated. On the other hand, if it is determined that the object data has been set as an object of the map generation processing, then the processing advances to step S305.

In step S305, it is determined whether or not there is a cache of the object data (page). If the reference command is an update command, the second node 1B determines whether or not there is a cache of the object of the update command, in respect of an update command of which the object is present in the database at the time of referring to the command (for example, a DELETE command). On the other hand, in the case of an update command in which the object is not present in the database at the time of referring to the command (for example, an INSERT command), then it is determined whether or not there is a cache of the object of the update command, by determining whether or not there is a cache of the data of the region where the object of the update command is inserted. If the record is managed in page units, then the second node 1B determines whether or not there is a cache of the page including the object of the update command. If there is a cache of the object page, then the processing advances to step S306. On the other hand, if there is no cache of the object page, then the processing advances to step S307.

In step S306, the update command relating to the transaction log is executed. The execution unit 33 executes the update command relating to the transaction log, in respect of the data that has been set in a cache by being expanded into the memory by the expansion unit 37, of the received data. Thereupon, the processing advances to step S308.

In step S307, a map is generated. If there is no cache of the page that is the object of the update command included in the transaction log (if the procedure advances to "NO" in step S305), then the map generation unit 34 waits for execution of the update command, by recording, in a map, information indicating the relationship between the update command and the page containing the data that is the object of the update command included in the transaction log. In other words, when the execution of the update command is made to wait, the map generation unit 34 sets the update command as an object of mapping (map generation) and generates a map that records the contents of the waiting update command, in association with the record. All of the update commands may be set as an object of map generation. In the present embodiment, the map records at least one of the contents and the LSN of the update command that is waiting, in association with the page (specifically, the page number) including the record that is the object of the update command. Thereupon, the processing advances to step S308.

In step S308, it is determined whether or not the map generation processing has ended. If the map generation processing has not ended, the processing returns to step S301, and the next command is referenced in time sequence order in the transaction log (in LSN order), and is set as the object of the processing indicated in step S304 to step S307. Normally, in order that the transaction log generated newly in the first node 1A is reflected in the second node 1B, the map generation processing is executed repeatedly while the second node 1B is operating. In other words, in the present embodiment, the second node 1B examines the received transaction logs in order from the oldest log, and if the page that is the object of an update command included in a transaction log is on the memory (cached), then an update command corresponding to the transaction log is executed in respect of the cache. If, on the other hand, the map generation processing has ended due to a reason such as the stopping of the second node 1B, then the processing indicated in the present flowchart is terminated.

If the object page has been cached, then the map generated by the map generation processing is referenced in the update execution processing or search request response processing, and the waiting update command is executed in the update execution processing or search request response processing. In other words, according to the system of the present embodiment, the reflection of the transaction log in the data received from the first node can be delayed until the time at which the object data is actually to be used (in other words, the time when the data is cached).

In this respect, the transaction log in which the contents of the update command have been recorded is held in the RAM 12B or the auxiliary storage device 14B of the node 1B. In the update execution processing or search request response processing, access to the transaction log held in the RAM 12 or storage device 14 is carried out on the basis of the LSNs recorded in the map, and the contents of the update command to be executed are identified.

In the map generation processing, the contents or LSN of the update command are recorded in a map in accordance with the sequence of reference. Consequently, in the update execution processing or search request response processing described below, it is possible to recognize the execution sequence of the newest command that is waiting. Even if the contents or LSN of the update command are not recorded in the map in accordance with the reference sequence number, then it is still possible to recognize the execution sequence of the update command, from the LSN of the waiting update command in the update execution processing or the search request response processing.

Figure 6:
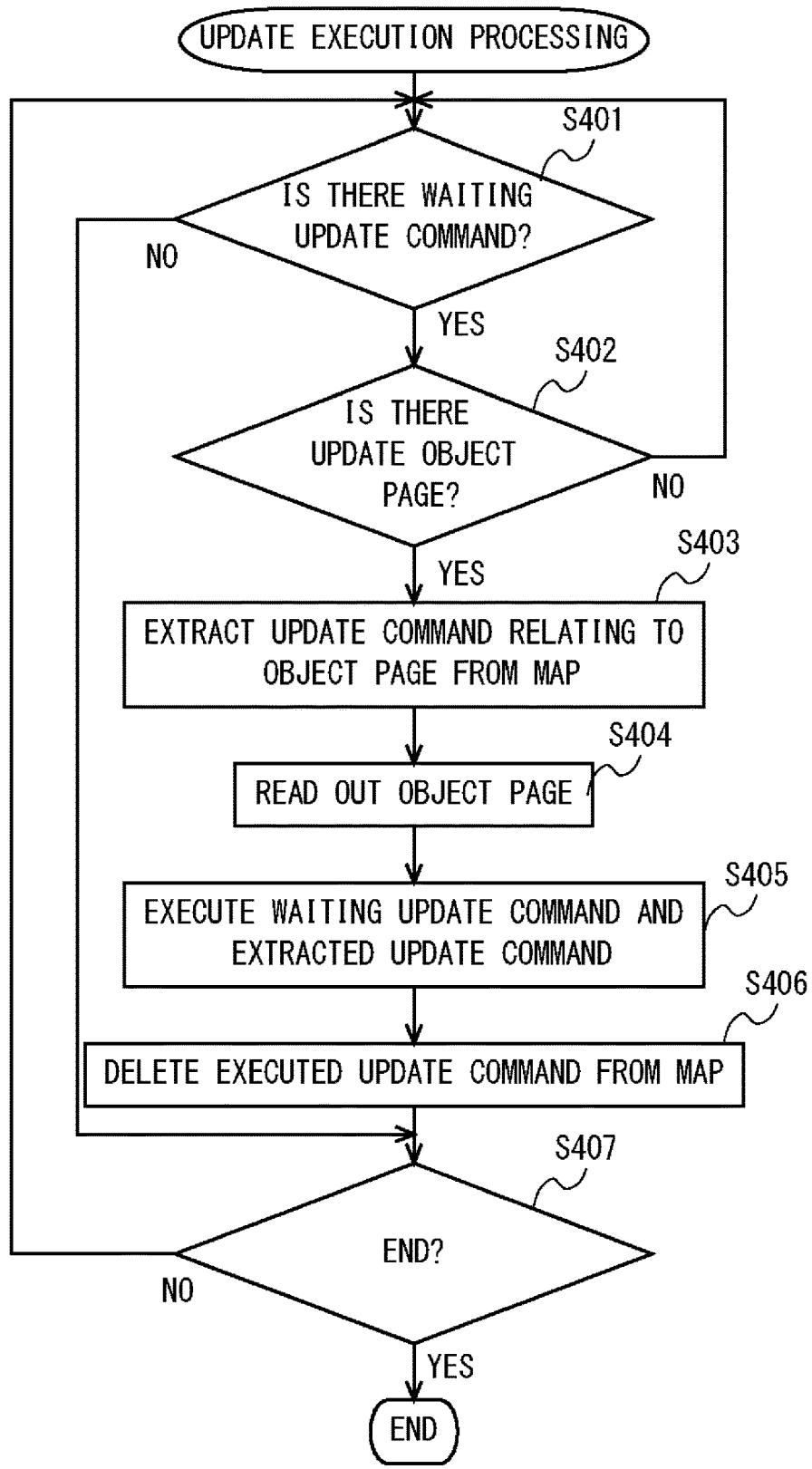
FIG. 6 shows a flowchart illustrating a flow of update execution processing which is executed by the second node in an embodiment of the disclosure.

FIG. 6 shows a flowchart illustrating a flow of update execution processing which is executed by the second node 1B in the present embodiment. The processing illustrated in the flowchart is carried out repeatedly while there is a waiting update command in the map.

In step S401, the presence or absence of a waiting update command is determined. The second node 1B refers to the map and determines whether or not there is a waiting update command. If a waiting update command has not been recorded in the map, then the processing indicated in the present flowchart is terminated. On the other hand, if a waiting update command is recorded in the map, then the second node 1B selects the management unit containing the data that is the object of the update command, as the object of processing, and the procedure advances to step S402.

In step S402, it is determined whether or not there is an update object. The second node 1B determines whether or not the object of the processing selected in the step S401 is present in the second node 1B, in other words, whether or not the page that is the object of processing has been received already from the first node 1A. If there is no page that is an object of updating, the processing returns to step S401. In other words, the second node 1B refers to the map and waits for the waiting update command, in respect of the page located in the second node 1B. If there is a page that is an object of updating, then the processing advances to step S404.

In step S403, the update command relating to the update object page is extracted from the map. The second node 1B extracts, from the map, all of the update commands relating to the update object page that has been determined to be present in step S402. By adopting a configuration of this kind, all of the update commands in the map relating to the update object page are executed, and the page for which the update commands have been executed is cached directly and thus made available for data searching or processing. Thereupon, the processing advances to step S404.

In step S404, the expansion unit 37 reads out the object to be processed by the expansion unit 37, from the auxiliary storage device 14B to the RAM 12B, and caches the object. Thereupon, the processing advances to step S405.

In step S405 and step S406, the update command waiting in the map and the extracted update command are executed, and the executed update command is deleted from the map. The execution unit 33 refers to the map and executes an update command associated with the processing object selected by the execution unit 33 (step S405). In other words, the execution unit 33 executes the update command discovered in step S401 and the update command extracted in step S403, in units of one page, which is the predetermined management unit, in the sequence in which the commands are recorded in the map. For example, in a case where the update command is a delete command, the execution unit 33 assigns a deletion pointer to the object record. The second node 1B, after executing the update command waiting in respect of the processing object selected by the second node 1B, then deletes the record relating to the executed update command, from the map (step S406). Thereupon, the processing advances to step S407.

In step S407, it is determined whether or not the update execution processing has ended. If the update execution processing has not ended, then the processing returns to step S401. In other words, in the update execution processing, if a plurality of update commands are waiting for a page selected as a processing object, these waiting update commands are executed in the order in which they are recorded in the map (in LSN order). Consequently, it is possible to maintain the consistency of the database that is in the process of being replicated, between the node 1 and the replication source computer, in respect of that page. If, on the other hand, the update execution processing has ended due to a reason such as the stopping of the second node 1B, then the processing indicated in the present flowchart is terminated.

The second node 1B may start up a plurality of instances for executing the update execution processing, and may increase or decrease the number of instances executing the update execution processing by generating or deleting, starting up or stopping these instances. For example, the second node 1B may increase or decrease the number of instances started up, in accordance with the number of management units of the waiting update command that has been recorded in the map (in the present embodiment, the number of pages). In this case, it is possible to vary the processing capability of the update execution processing according to requirements, and since the existence of unnecessary instances can be avoided, then it is possible to use the resources efficiently.

Furthermore, for example, a certain number of instances for executing the update execution processing may be started up beforehand. In this case, the instances do not need to be started up again when a requirement for processing occurs, and therefore it is possible to respond quickly to a requirement that arises.

Figure 7:
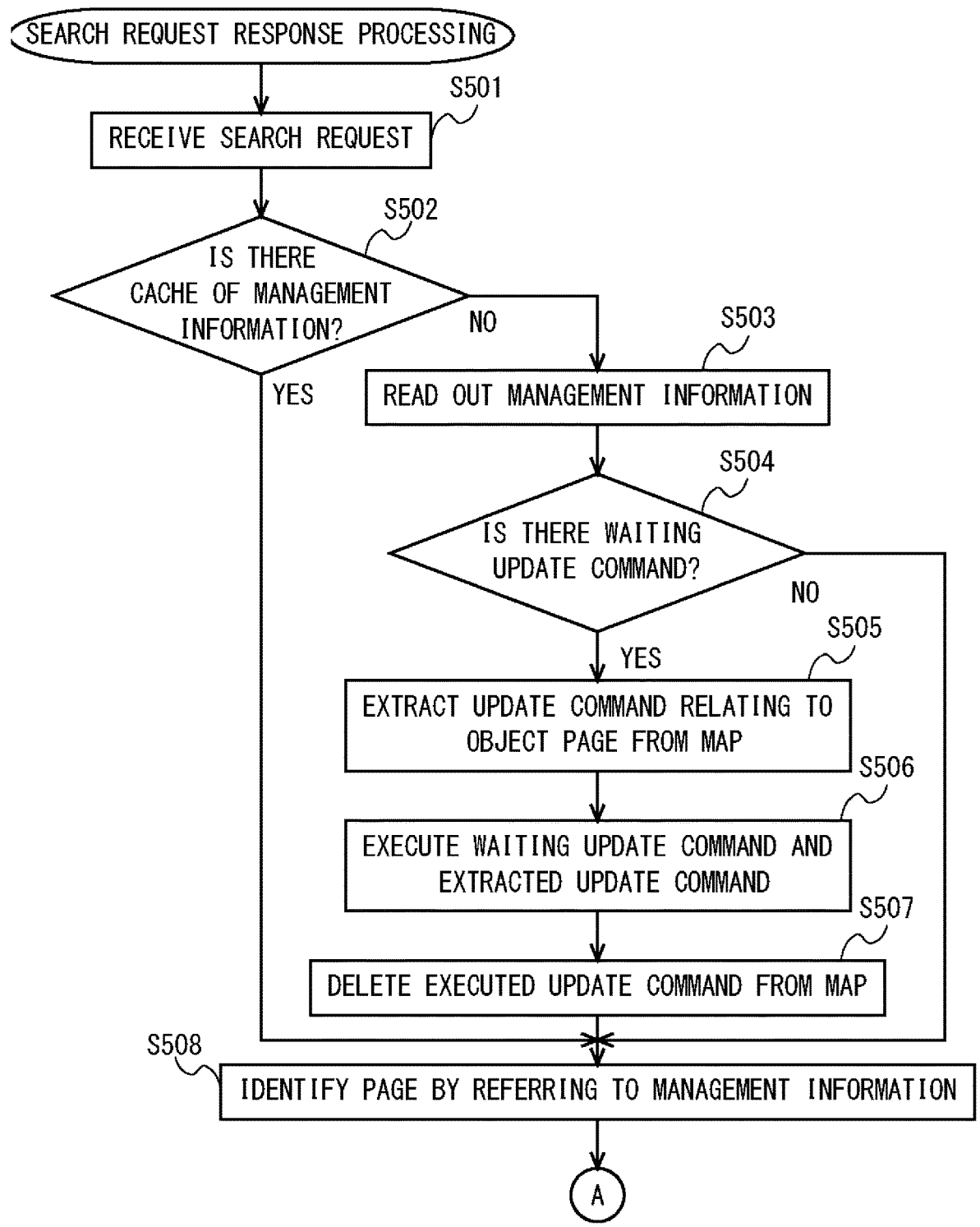
FIG. 7 shows a flowchart (1) illustrating a flow of search request response processing which is executed by the second node in an embodiment of the disclosure.
Figure 8:
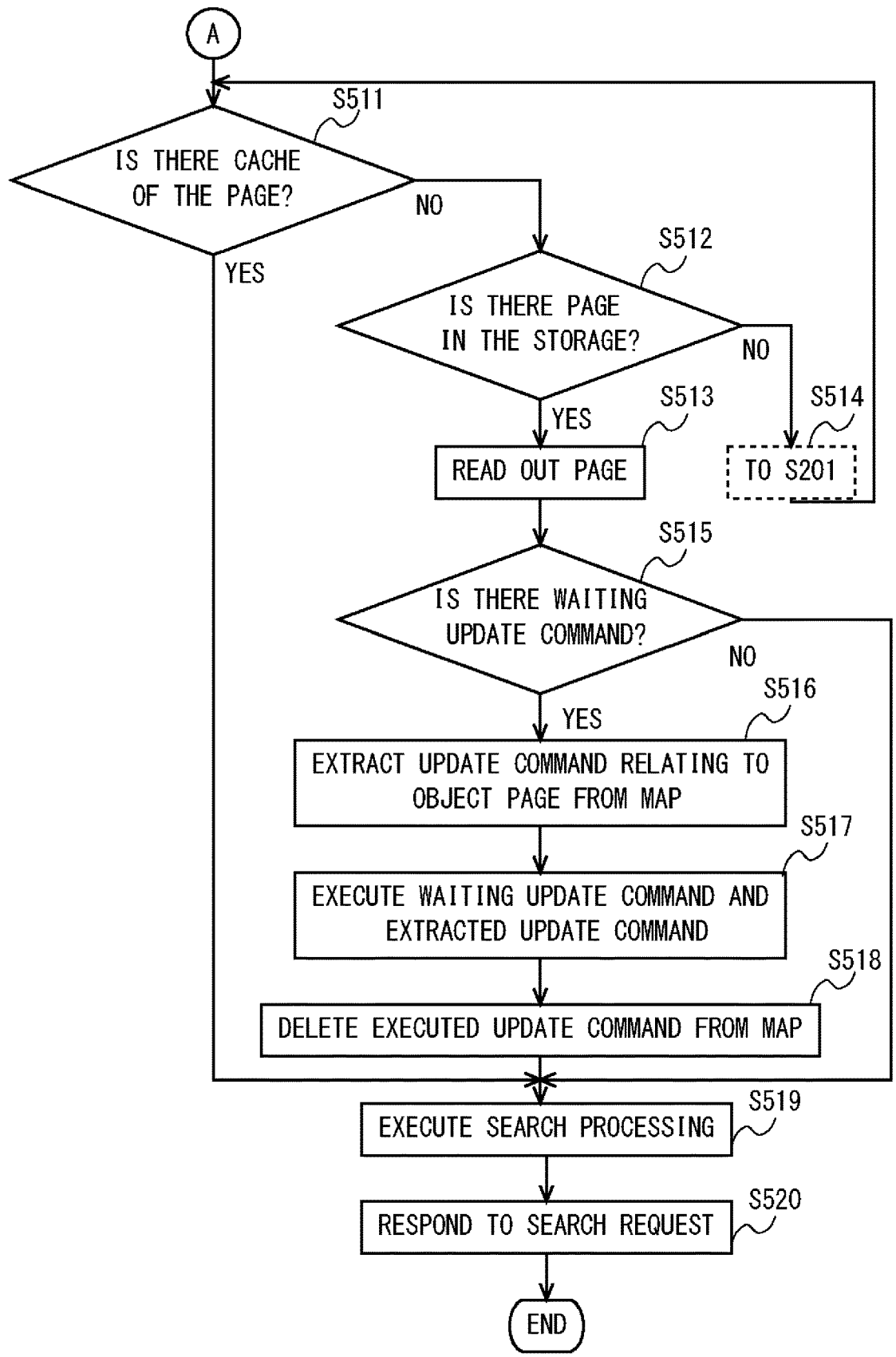
FIG. 8 shows a flowchart (2) illustrating a flow of search request response processing which is executed by the second node in an embodiment of the disclosure.

FIG. 7 and FIG. 8 shows a flowchart illustrating a flow of search request response processing which is executed by the second node 1B in the present embodiment. The processing indicated in the present flowchart is started when a query is received by the second node 1B from a use terminal 9, or the like.

In step S501, the query is received. The search request reception unit 35 receives the query from the user terminal 9. Thereupon, the processing advances to step S502.

In step S502, it is determined whether or not there is a management information cache. The search response unit 36 determines whether or not there is a cache of management information, on the memory. In the present embodiment, the records are managed in page units, and therefore the search response unit 36 determines whether or not there is a cache of the page including the management information in the search object.

In the present embodiment, the update command waiting in respect of the page in question is executed when the page including the management information has been read out to the RAM 12B (see FIG. 6 and the processing indicated from step S504 to step S507 described below). Furthermore, the update command relating to the page which is cached is executed immediately (see the map generation processing described with reference to FIG. 5). Therefore, in the present embodiment, if there is already a cache of the page including the management information (if the determination result in step S502 is "YES"), then the execution of the update command for that page is not made to wait. Consequently, if there is a cache of the page including the management information, then the search response unit 36 does not read out data from the storage area, but rather sets the management information already present in the cache as the reference object, and then proceeds to step S508. On the other hand, if there is no cache of the management information, then the processing advances to step S503.

In step S503, the management information is read out from the storage device. In the present embodiment, the management information transmission and reception processing is carried out at the start of construction of the database (see FIG. 3), and therefore even if the management information is not present in the cache at the time that the query is received, the second node 1B holds the management information in a storage device. If there is no cache of the management information, the expansion unit 37 reads out the management information from the storage device (auxiliary storage device 14B) to the RAM 12B. Thereupon, the processing advances to step S504.

In step S504, the presence or absence of a waiting update command is determined. The second node 1B refers to the map and determines whether or not there is a waiting update command relating to the page of management information that has been read out to the RAM 12B. If the waiting update command relating to the page read out to the RAM 12B has not been recorded in the map, then the processing advances to step S508. On the other hand, if the waiting update command relating to the page read out to the RAM 12B has been recorded in the map, then the processing advances to step S505.

In step S505, the update command relating to the update object page is extracted from the map. The second node 1B extracts, from the map, all of the update commands relating to the update object page (here, the page containing management information) that has been determined to be present in step S503. By adopting a configuration of this kind, all of the update commands in the map relating to the update object page are executed, and the page for which the update commands have been executed is cached directly and thus made available for data searching or processing. Thereupon, the processing advances to step S506.

In step S506 and step S507, the update command waiting in the map and the extracted update command are executed, and the executed update command is deleted from the map. The execution unit 33 refers to the map and executes an update command associated with the management information that has been read out to the RAM 12B (step S506). In other words, in the present embodiment, the second node 1B, in response to a query (step S501), expands the management information received by the data reception unit 32 (step S207), to the memory (step S503), and executes an update command in respect of the management information, on the basis of the map.

Here, the execution unit 33 executes the waiting update commands in the order in which the commands are recorded in the map. The second node 1B, after executing all of the update commands waiting in respect of the management information read out to the RAM 12B, then deletes the record relating to the executed update commands, from the map (step S507). Thereupon, the processing advances to step S508.

In step S508, the management information is referenced and the page is identified. The search response unit 36 refers to the management information in order to identify the storage area specified by the search range in the received query. In the present embodiment, the page containing the data required in order to process the query is identified by referring to the management information. Thereupon, the processing advances to step S511.

In step S511, it is determined whether or not there is a cache of the search object data (page). The search response unit 36 accesses the storage area specified in the search range of the query, in order to extract a record that matches the content of the received query. The search response unit 36 then determines whether or not there is a cache of the record relating to the query, on the memory. In the present embodiment, the records are managed in page units, and therefore the search response unit 36 determines whether or not there is a cache of the page including the record in the search object.

In the present embodiment, the update command waiting in respect of the page in question is executed when the page including the management information has been read out to the RAM 12B (see FIG. 6 and FIG. 8 and the processing indicated from step S515 to step S518 described below). Furthermore, the update command relating to a page which is cached is executed immediately (see the map generation processing described with reference to FIG. 5). Therefore, in the present embodiment, if there is already a cache of the page included in the search range (if the determination result in step S511 is "YES"), then the execution of the update command for that page is not made to wait. Consequently, if there is a cache of the object page, then the search response unit 36 does not read out data from the storage area, but rather sets the page already present in the cache as the object of the search processing, and then proceeds to step S519. On the other hand, if there is no cache of the object page, then the processing advances to step S512.

In step S512, it is determined whether or not the search object page is present in the storage (database) of the second node 1B. As described above, in the present embodiment, the page transmission request is carried out progressively (see step S201), and there may be cases where the second node 1B does not have the page relating to a query, at the time of receiving the query. If it is determined that the page is not present in the storage device, then the processing advances to step S514 in order to acquire the corresponding page from the first node 1A. On the other hand, if it is determined that the page is present in the storage device, then the processing advances to step S513.

In step S514, the database transmission and reception processing indicated in FIG. 4 is executed. If it is determined that the page is not present in the storage device in step S512, then the request transmission unit 31 transmits a data transmission request to the first node 1A, specifying at least the data relating to the query, from among the data in the database. In the present embodiment, the pages indicated in the management information are acquired sequentially, by repeating the database transmission and reception processing indicated in FIG. 4, but in the case of a page that has become a search object due to receiving a search request in step S501, the sequence is ignored and a data transmission request is issued preferentially for that page. In other words, according to the present embodiment, a page that has become a search object due to the reception of a search request can be set preferentially as a request (data transmission request) object. Thereupon, the processing returns to step S511.

The processing indicated in step S511 to step S514 is repeated until the object page is acquired from the first node 1A, and the response to the query received in step S501 waits until the object page is acquired from the first node 1A.

In step S513, the search object page is read out from the storage device. If there is no cache of the data (page) that is the search object, but the data (page) is present in the storage device of the second node 1B, the expansion unit 37 reads out the page from the storage device (auxiliary storage device 14B) to the RAM 12B, and sets the page as the object of the search processing. Thereupon, the processing advances to step S515.

When the expansion unit 37 reads out the pages included in the search range, from the auxiliary storage device 14B to the RAM 12B, the unit may read the pages one by one for each object, or may read out a plurality of pages simultaneously. In this case, each time one or a plurality of pages are read out, the execution unit 33 executes the processing from step S515 onwards, on the one or plurality of pages that have been read out.

In step S515, the presence or absence of a waiting update command is determined. The second node 1B refers to the map and determines whether or not there is a waiting update command relating to the page that has been read out to the RAM 12B. If the waiting update command relating to the page read out to the RAM 12B has not been recorded in the map, then the processing advances to step S519. On the other hand, if the waiting update command relating to the page read out to the RAM 12B has been recorded in the map, then the processing advances to step S516.

In step S516, the update command relating to the update object page is extracted from the map. The second node 1B extracts, from the map, all of the update commands relating to the update object page that has been determined to be present in step S515. By adopting a configuration of this kind, all of the update commands in the map relating to the update object page are executed, and the page for which the update commands have been executed is cached directly and thus made available for data searching or processing. Thereupon, the processing advances to step S517.

In step S517 and step S518, the update command waiting in the map and the extracted update command are executed, and the executed update command is deleted from the map. The execution unit 33 refers to the map and executes an update command relating to the page that has been read out to the RAM 12B (step S517). In other words, in the present embodiment, the second node 1B, in response to a query (step S501), expands the data received by the data reception unit 32 (step S207), to the memory (step S513), and executes an update command in respect of the data, on the basis of the map.

Here, the execution unit 33 executes the waiting update commands in the order in which the commands are recorded in the map (in LSN order). The second node 1B, after executing all of the update commands waiting in respect of the page read out to the RAM 12B, then deletes the record relating to the executed update commands, from the map (step S518). Thereupon, the processing advances to step S519.

In this way, in the search request response processing, similarly to the update execution processing, if a plurality of update commands are waiting for a page selected as a processing object, these waiting update commands are executed in the order in which they are recorded in the map (in LSN order). Therefore, it is possible to maintain consistency of the database, between the first node 1A and the second node 1B, in respect of that page.

In step S519, the search response unit 36 executes a search processing corresponding to the received query, in respect of the page acquired from the first node 1A in which the update command has been reflected. Thereupon, the processing advances to step S520.

In step S520, a response to the search request (query) is transmitted. The search response unit 36 transmits the result of the search processing, to the user terminal 9, as a response to the query. Subsequently, the processing indicated in the present flowchart is terminated.

The second node 1B may start up a plurality of instances for executing the search request response processing, and may increase or decrease the number of instances executing the search request response processing by generating or deleting, starting up or stopping these instances. For example, the second node 1B may increase or decrease the number of instances started up in accordance with the number of queries received from the user terminal 9. In this case, it is possible to vary the processing capability of the search request response processing according to requirements, and the existence of unnecessary instances can be avoided, and therefore it is possible to use the resources efficiently.

Furthermore, the search request response processing may be executed by being divided into a plurality of instances. For example, the processing from step S515 to step S518, of the search request response processing, may be executed by an instance that is different from other processing. In this case, for example, after the page read-out (step S513) has been carried out in the first instance for executing the processing other than step S515 to step S518, in order to update the page, the processing continues in a second instance for executing the processing from step S515 to step S518. Thereupon, when the processing in step S518 in the second instance has ended, the processing returns to the first instance and the search processing in step S519 is executed.

Effects of System According to First Embodiment

According to the system relating to the present embodiment, it is possible to transmit data from the first node 1A to the second node 1B, for each portion of the database (each predetermined management unit, such as a page), without copying the whole database in one operation and without creating check points. Furthermore, the second node 1B can reflect the transaction log in parallel for each portion of the database, without being concerned with the interdependence between update commands based on the transaction logs. Moreover, by generating a map, it is possible to delay the execution of update commands based on transaction logs, and to then execute the update commands based on the transaction logs, in parallel for each predetermined management unit, on the basis of the map, when the received data has been expanded into the memory.

Consequently, according to the system of the present embodiment, it is possible to make the received data available for a query in the second node 1B, without waiting for the replication of the whole database to be completed.

Furthermore, in the system according to the present embodiment, since the transmission of data from the first node 1A to the second node 1B is carried out in accordance with a data transmission request, then the timing of data acquisition can be adjusted, for instance, the data acquisition can be performed progressively. Moreover, by issuing a data transmission request and reflecting a transaction log in accordance with a search request received by the second node 1B, it is possible to preferentially acquire the data that is the search object, and to reflect the transaction log preferentially. In other words, according to the system of the present embodiment, it is possible to receive a search request from the user terminal, in a state where the second node 1B has not received all of the data.

Second Embodiment

Next, a second embodiment will be described. A system according to the second embodiment adds a configuration to the system according to the first embodiment, in order to enable the second node to respond to a query, without holding the whole of the database in the second node. In the first embodiment, when the database transmission and reception processing for all pages has been completed, the whole database is held in the second node, but in the second embodiment, the data in the database is not held permanently in the second node, with the exception of the data determined to be an object for holding. In the system according to the second embodiment, the parts of the configuration which are the same as the system according to the first embodiment described above are labeled with the same reference numerals and description thereof is omitted here.

<<System Configuration>>

The hardware configuration of the system according to the second embodiment is substantially the same as the hardware configuration of the system according to the first embodiment, and therefore description thereof is omitted (see FIG. 1). In the second embodiment, the functional configuration of the second node differs from the first embodiment, and therefore the second node is labeled with the reference numeral "1B'".

Figure 9:
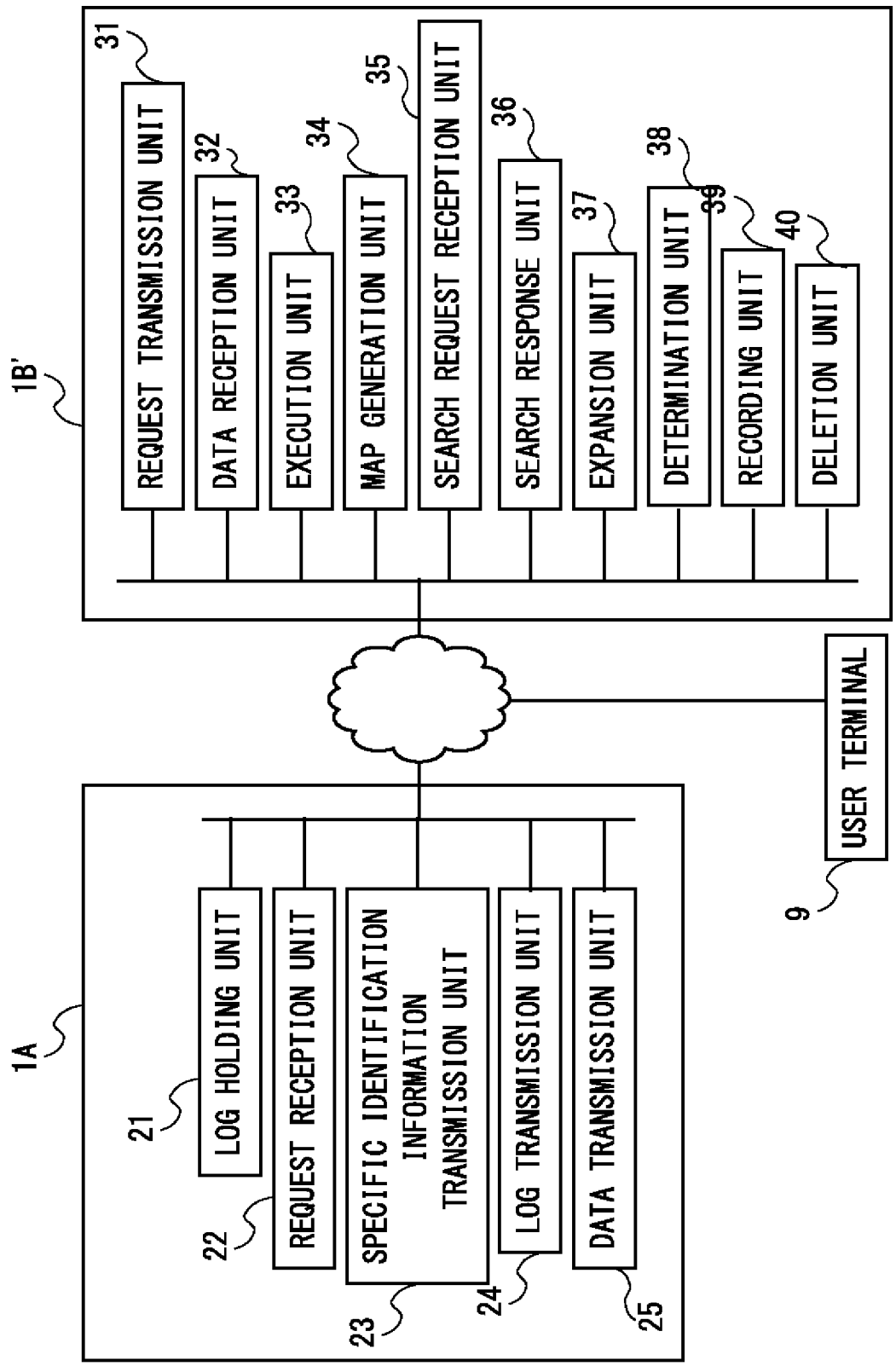
FIG. 9 is a diagram showing a schematic view of the functional configuration of the first node and the second node relating to an embodiment of the disclosure.

FIG. 9 is a diagram showing a schematic view of the functional configuration of a first node 1A and a second node 1B' relating to the present embodiment. The functional configuration of the first node 1A according to the present embodiment is substantially the same as the first embodiment and therefore description thereof is omitted here. Furthermore, in the second node 1B' relating to the present embodiment, the CPU 11B interprets and executes various programs which have been developed in the RAM 12B, and by controlling various hardware provided in the node 1B', the CPU 11B functions as a computer provided with a request transmission unit 31, a data reception unit 32, an execution unit 33, a map generation unit 34, a search request reception unit 35, a search response unit 36, an expansion unit 37, a determination unit 38, a recording unit 39 and a deletion unit 40. In the present embodiment, an example is described in which the functions of the second node 1B' are executed by a generic CPU 11B, but all or a portion of these functions may also be achieved by one or a plurality of dedicated processors.

The request transmission unit 31, data reception unit 32, execution unit 33, map generation unit 34, search request response unit 35, search response unit 36 and expansion unit 37 are substantially similar to the first embodiment and therefore description thereof is omitted here.

The determination unit 38 determines whether or not the data acquired from the first node 1A in accordance with the search request, on which a command based on a transaction has been executed, is an object for holding in the second node 1B'.

The recording unit 39 records data which has determined to be an object of holding by the determination unit 38, in the auxiliary storage device 14B which is a non-volatile storage device.

After the data acquired from the first node 1A in accordance with the search request and on which the command based on the transaction has been executed has been used for a response by the search response unit 36, the deletion unit 40 then deletes the data automatically from the second node in accordance with predetermined conditions.

<<Flow of Processing>>

Next, the details of the processing relating to the present embodiment will be described. The specific content and sequence, etc. of the processing described in the present embodiment is one example of implementation. The specific content and sequence of the processing, etc. may be selected, as appropriate, in accordance with the mode of implementing the present disclosure.

The database transmission and reception processing (see FIG. 4), map generation processing (see FIG. 5) and update execution processing (see FIG. 6) described in the first embodiment are carried out also in the second embodiment. The details of the processing are as described in the first embodiment and therefore are not explained further here.

Figure 10:
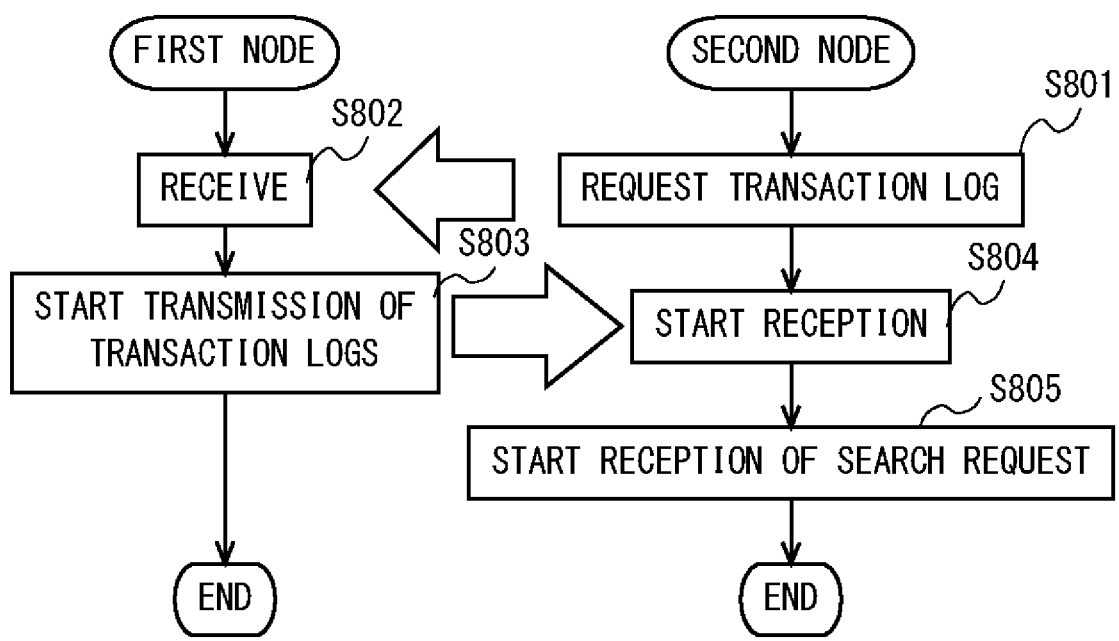
FIG. 10 is a flowchart illustrating a flow of transaction log transmission and reception start processing which is executed by the first node and the second node in an embodiment of the disclosure.

FIG. 10 shows a flowchart illustrating a flow of transaction log transmission and reception start processing which is executed by the first node 1A and the second node 1B' in the present embodiment. The processing indicated in this flowchart is executed instead of the management information transmission and reception processing described in the first embodiment (see FIG. 3), and is started upon receiving an instruction to start construction of a database.

In step S801 and step S802, a transaction log request is transmitted and received. The request transmission unit 31 transmits a transaction log transmission request to the first node 1A (step S801). The request reception unit 22 receives a request transmitted by the second node 1B' (step S802). Thereupon, the processing advances to step S803.

In step S803 and step S804, transmission and reception of the transaction logs is started. Thereafter, the log transmission unit 24 successively transmits, to the second node 1B', the transaction logs and LSN that are newly generated in the first node 1A, in association with each other, as they are generated (step S803). The data reception unit 32 of the second node 1B' starts reception of the transaction logs and the LSN relating to the transaction logs, which are transmitted by the first node 1A (step S804). In other words, after the start of transmission of the logs, the second node 1B' receives all of the transaction logs from the predetermined time point onwards. Thereupon, the processing advances to step S805.

In step S805, the reception of a search request (query) is started. By starting the on-demand processing described below, the second node 1B' starts the reception of a query that is transmitted from the user terminal 9. Thereafter, the search request reception unit 35 receives a query from the user terminal 9, and upon receiving the query, the page (containing management information) which is required in order to respond to the query is acquired. Subsequently, the processing indicated in the present flowchart is terminated.

In other words, in the second embodiment, in contrast to the first embodiment, the management information transmission and reception processing is not carried out at the start of construction of the database.

Furthermore, in relation to the database transmission and reception processing shown in FIG. 4, in the first embodiment, it is stated that this processing is "started when it has become possible to identify the page configuration of the database managed by the first node 1A", but in the second embodiment, unlike the first embodiment, this processing is executed whenever called during the on-demand processing which is described below (see step S605 and step S514 described below).

Figure 11:
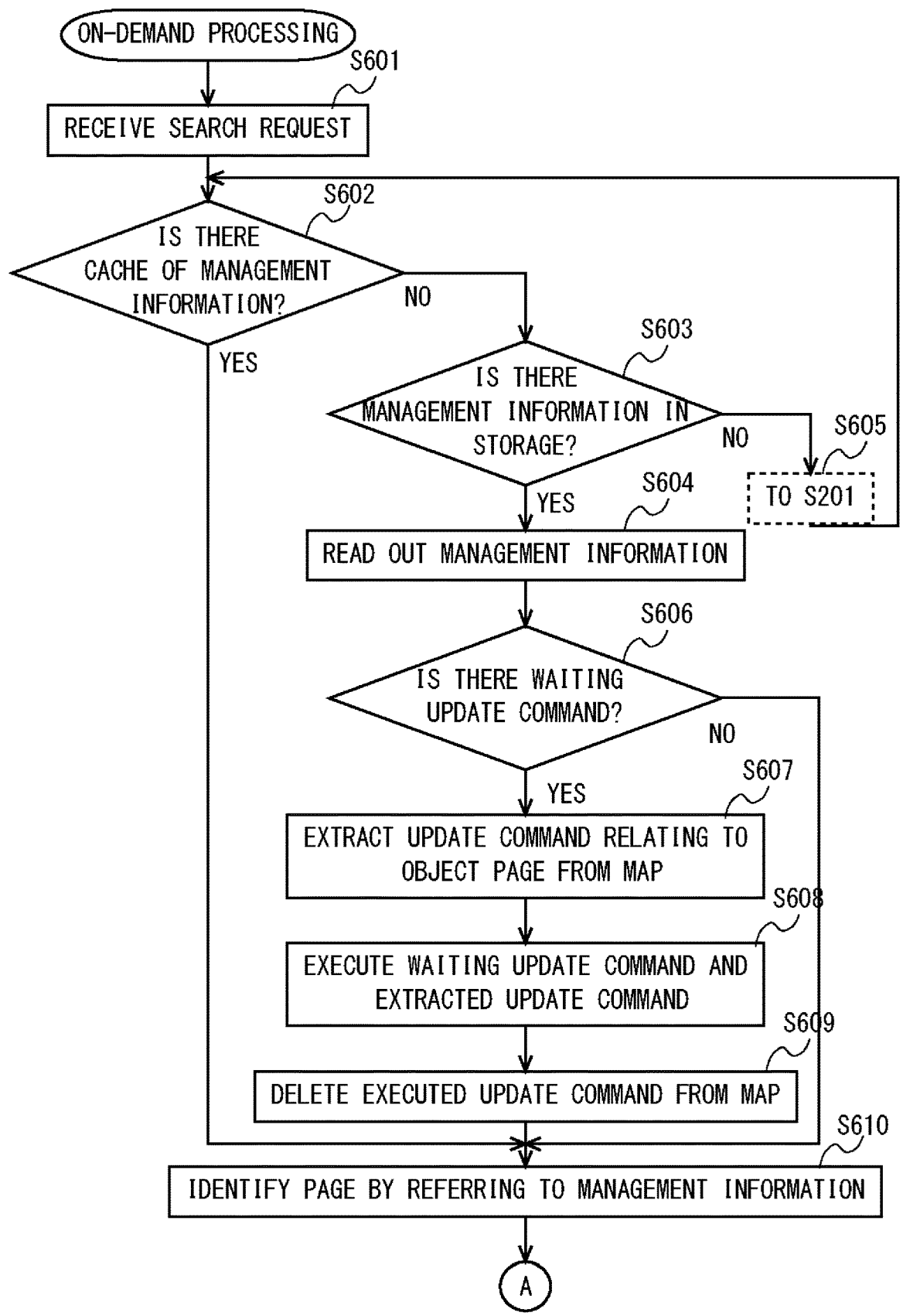
FIG. 11 shows a flowchart illustrating a flow of on-demand processing which is executed by the second node in an embodiment of the disclosure.

FIG. 11 shows a flowchart illustrating a flow of on-demand processing which is executed by the second node 1B' in the present embodiment. The processing indicated in the present flowchart is started when a query is received by the second node 1B' from a user terminal 9, or the like. In other words, in the present embodiment, the on-demand processing is executed instead of the search request response processing described in the first embodiment (see FIG. 7 and FIG. 8).

Here, in the second embodiment, as described above, management information transmission and reception processing is not carried out at the start of configuration of the database. Therefore, when the search request is received, it is possible that the second node 1B' is not holding management information. If the second node 1B' is not holding management information, then the page relating to the query cannot be specified in the data transmission request. Consequently, in the on-demand processing relating to the present embodiment, when a search request is received, firstly, it is confirmed whether or not the second node 1B' is holding management information. If the second node 1B' is not holding management information, then the database transmission and reception processing is executed after acquiring this information from the first node 1A. Below, the details of the on-demand processing relating to the present embodiment will be described with reference to FIG. 11.

In step S601, the query is received. The search request reception unit 35 receives the query from the user terminal 9. Thereupon, the processing advances to step S602.

In step S602, it is determined whether or not there is a management information cache. The search response unit 36 determines whether or not there is a cache of management information on the memory. In the present embodiment, the records are managed in page units, and therefore the search response unit 36 determines whether or not there is a cache of the page including the management information in the search object.

In the present embodiment, the update command waiting in respect of the page in question is executed when the page including the management information has been read out to the RAM 12B (see FIG. 6 and the processing indicated from step S606 to step S609 described below). Furthermore, an update command relating to a page which is cached is executed immediately (see the map generation processing described with reference to FIG. 5). Therefore, in the present embodiment, if there is already a cache of the page including the management information (if the determination result in step S602 is "YES"), then the execution of the update command for that page is not made to wait. Consequently, if there is a cache of the page including the management information, then the search response unit 36 does not read out data from the storage region, but rather sets the management information already present in the cache as the reference object, and then proceeds to step S610. On the other hand, if there is no cache of the management information, then the processing advances to step S603.

In step S603, it is determined whether or not a page containing management information is present in the storage (database) of the second node 1B'. As stated above, in the present embodiment, there is a possibility that the management information transmission and reception processing is not carried out by the start of construction of the database, and hence there are cases where the second node 1B' is not holding management information for identifying the page relating to the query, at the time of receiving the query. If it is determined that the management information is not present in the storage device, then the processing advances to step S605 in order to acquire the management information from the first node 1A. On the other hand, if it is determined that the page is present in the storage, then the processing advances to step S604.

In step S605, the database transmission and reception processing indicated in FIG. 4 is executed. If it is determined that the management information is not present in the storage in step S603, then the request transmission unit 31 transmits a data transmission request to the first node 1A, specifying the data relating to the management information, in accordance with the query. As described above, in the present embodiment, the transmission and reception of management information is also carried out in page units, similarly to the other tables, and therefore it is possible to acquire management information by the database transmission and reception processing shown in FIG. 4. Thereupon, the processing returns to step S602. The processing indicated in step S602 to step S605 is repeated until the management information is acquired from the first node 1A.

In step S604, the management information is read out from the storage device. If there is no cache of the management information, but the management information is present in the storage device of the second node 1B', then the expansion unit 37 reads out the management information from the storage device (auxiliary storage device 14B) to the RAM 12B. Thereupon, the processing advances to step S606.

In step S606, the presence or absence of a waiting update command is determined. The second node 1B' refers to the map and determines whether or not there is a waiting update command relating to the page of management information that has been read out to the RAM 12B. If the waiting update command relating to the page read out to the RAM 12B has not been recorded in the map, then the processing advances to step S610. On the other hand, if the waiting update command relating to the page read out to the RAM 12B has been recorded in the map, then the processing advances to step S607.

In step S607, the update command relating to the update object page is extracted from the map. The second node 1B' extracts, from the map, all of the update commands relating to the update object page (here, the page containing management information) that has been determined to be present in step S603. By adopting a configuration of this kind, all of the update commands in the map relating to the update object page are executed, and the page for which the update commands have been executed is cached directly and thus made available for data searching or processing. Thereupon, the processing advances to step S608.

In step S608 and step S609, the update command waiting in the map and the extracted update command are executed, and the executed update command is deleted from the map. The execution unit 33 refers to the map and executes an update command relating to the management information that has been read out to the RAM 12B (step S608). In other words, in the present embodiment, the second node 1B', in response to a query (step S601), expands the management information received by the data reception unit 32 (step S207), to the memory (step S604), and executes an update command in respect of the management information, on the basis of the map.

Here, the execution unit 33 executes the waiting update commands in the order in which the commands are recorded in the map. The second node 1B', after executing all of the update commands waiting in respect of the management information read out to the RAM 12B, then deletes the record relating to the executed update commands, from the map (step S609). Thereupon, the processing advances to step S610.

In step S610, the management information is referenced and the page is specified. The search response unit 36 refers to the management information in order to identify the storage area specified by the search range in the received query. In the present embodiment, the page containing the data required in order to process the query is identified by referring to the management information. Thereupon, the processing advances to processing of similar contents to the processing in step S511 to step S520 of the search request response processing illustrated with reference to FIG. 8.

In other words, the processing indicated in step S511 to step S514 is repeated until the object page is acquired from the first node 1A, and the response to the query received in step S601 waits until the object page is acquired from the first node 1A. In the present embodiment, an object of a request (data transmission request) is first set when a search request is received and a search object is set. Thereafter, the processing indicated in step S519 and step S520 is executed, and when the response to the query has been completed, the processing indicated in the present flowchart is terminated.

Figure 12:
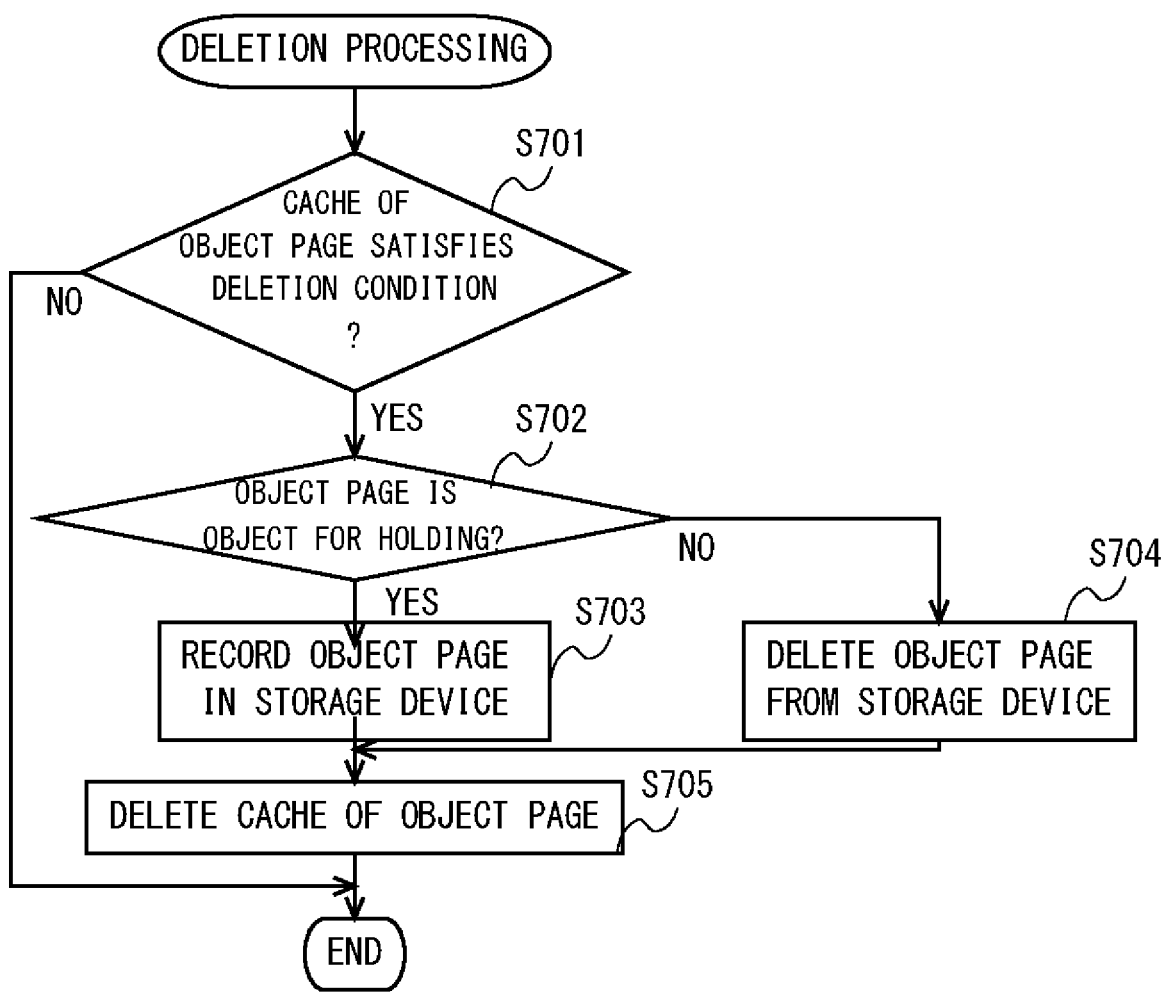
FIG. 12 shows a flowchart illustrating a flow of deletion processing which is executed by the second node in an embodiment of the disclosure.

FIG. 12 shows a flowchart illustrating a flow of deletion processing which is executed by the second node 1B' in the present embodiment. The processing indicated in the flowchart is executed periodically, for each data unit (in the present embodiment, each page) which has been expanded into the memory and cached, in the second node 1B'.

In step S701, it is determined whether or not the data satisfies a deletion condition. The deletion unit 40 determines whether or not the predetermined deletion conditions are satisfied in respect of the cache relating to the page that is the determination object, of the caches in the second node 1B'. The deletion condition used here is, for example, when a predetermined time period has elapsed from a time point relating to data processing (a time point acquired from the first node 1A, the time point last referenced for the purpose of a query response or update, etc.), and so on. The deletion condition is not limited to the example in the present embodiment. If it is determined that the deletion condition is not satisfied, then the cache relating to the page that is the determination object is not deleted, and the processing indicated in the present flowchart is terminated. On the other hand, if it is determined that the deletion condition is satisfied, then the processing advances to step S702.

In step S702, it is determined whether or not the data is an object for holding. The determination unit 38 determines whether or not the page that is the determination object, of the data held by the second node 1B' is an object for holding in the second node 1B'. Here, the condition for this determination may be set on the basis of the frequency with which said data is referenced in a query, for example. For example, by setting data having a high frequency of reference to be an object for holding, and setting data having a low frequency not to be an object for holding, it is possible to save the storage device and/or memory of the second node 1B', without sacrificing the speed of response to queries. Furthermore, it is also possible, for example, to set a table and/or page specified in advance by an administrator, or the like, as an object for holding. The condition for determining whether or not to set data as an object for holding is not limited to the example in the present embodiment. The determination condition can be used, as appropriate, in accordance with the embodiment. If the page that is the determination object does not satisfy the condition for setting the data as an object for holding, then the processing advances to step S704. On the other hand, if the page that is the determination object satisfies the condition for setting the data as an object for holding, then the processing advances to step S703.

In step S703, the data is recorded in the storage device. The recording unit 39 records the data that has been determined to be an object for holding by the determination unit 38 (in the present embodiment, this determination is made in page units), in the storage device (in the present embodiment, the auxiliary storage device 14B). Thereupon, the processing advances to step S705.

In step S704, the data which satisfies the deletion condition is deleted from the storage device. If the data determined not to be an object for holding by the determination unit 38 (in the present embodiment, this determination is made in page units) has been recorded in the storage device of the second node 1B', then the deletion unit 40 deletes this data from the storage device (in the present embodiment, the auxiliary storage device 14B). By adopting a configuration of this kind, even if data has been recorded temporarily in the storage device before being received and cached, that data can be deleted from the storage device. Thereupon, the processing advances to step S705.

In step S705, the cache of data which satisfies the deletion condition is deleted from the storage device. The deletion unit 40 deletes the cache of the page which satisfies the deletion condition, from the memory of the second node 1B'. Subsequently, the processing indicated in the present flowchart is terminated.

In the flowchart shown in FIG. 12, it is determined whether or not the cached data is an object for deletion. It may be determined, periodically, whether or not data that is held in the storage device but has not been cached is an object for holding, and if the condition for setting the data as an object for holding (see step S702) has not been satisfied, then the data may be deleted from the storage device. By adopting a configuration of this kind, then even data of a type that is held in the storage device only can be deleted from the storage device with the passage of time, thereby saving the capacity of the storage device.

Effects of System According to Second Embodiment

According to the system relating to the second embodiment, it is possible to obtain similar beneficial effects to the system relating to the first embodiment. Furthermore, in the second embodiment, by further providing the determination unit 38, the recording unit 39 and the deletion unit 40, it is possible to provide a service to the user terminal 9 just as though the second node 1B' were holding data relating to the entire database, while saving the storage device and memory requirements of the second node 1B'.

Furthermore, by setting the conditions used by the determination unit 38 and the deletion unit 40, as appropriate in accordance with the mode of implementing the present disclosure, it is possible to construct a system which involves little waste of resources, in terms of the balance between the storage resources and the network resources.

What is claimed is:
1. A database system comprising a plurality of nodes, wherein a first node which is a replication source of a database, among the plurality of nodes, comprises:
   a first memory; and
   a first processor connected to the first memory, the first processor being configured to:

hold a transaction log of a database managed by the first node, together with identification information items enabling identification of a sequence of commands relating to the transaction log;

transmit specific identification information indicating a transaction log at a predetermined time point, from among the identification information items, to a second node which is a replication destination of the database among the plurality of nodes;

transmit, to the second node, the transaction log and the identification information from at least after the predetermined time point, in association with each other; and transmit data managed by the database to the second node, from the predetermined time point onwards, respectively in predetermined management units divided so that records of the database having an interdependent sequence of commands relating to the transaction logs are included in a same predetermined management unit, and wherein the second node comprises:
a storage device;
a second memory; and
a second processor connected to the storage device and the second memory, the second processor being configured to:

perform reading of search object data, of a search processing in the database from the storage device onto the second memory, and writing of the search object data from the second memory onto the storage device in the predetermined management unit including the search object data;

receive the transaction log, the identification information of the transaction log, the specific identification information and the data in the predetermined management units, from the first node;

generate a map indicating a relationship between the predetermined management unit containing data that is an object of a command, and the contents of the command, on the basis of the transaction log, of the received transaction logs, which is at least newer than the transaction log indicated by the specific identification information;

make the predetermined management unit including the search object data among received predetermined management units available for data search, by expanding the predetermined management unit from the storage device into the second memory; and execute a command relating to a transaction log, of the received transaction logs, which is at least newer than the transaction log indicated by the specific identification and targeting the data included in the predetermined management unit that has been expanded into the second memory, by referring to the map, until the search processing is executed on the search object data included in the predetermined management unit that has been expanded into the second memory.

2. The database system according to claim 1, wherein the first processor is configured to transmit to the second node the data which has been expanded into the first memory and is in a state available for data search or processing.

3. The database system according to claim 2,
wherein the the first processor is configured to transmit, to the second node, management information of the database, and
wherein the second processor is configured to refer to the management information and transmit the transmission request to the first node by specifying the data in the database.

4. The database system according to claim 1,
wherein the second processor is further configured to transmit, to the first node, a transmission request by specifying the data in the database,
wherein the first processor is further configured to receive, from the second node, the transmission request for the data managed by the first node,
wherein the first processor is configured to transmit, to the second node, the specific identification information relating to the data, in accordance with the transmission request, and
wherein the first processor is configured to transmit the data to the second node, in accordance with the transmission request.

5. The database system according to claim 4,
wherein the second processor is further configured to:
receive a search request from a user terminal; and
send back, to the user terminal, a response to the search request,
wherein the second processor is configured to transmit, to the first node, the transmission request for the data relating to the search request,
wherein the second processor is configured to expand the data that has been transmitted from the first node and received by the second node in accordance with the transmission request, into the second memory, and to execute the command relating to the transaction log on the data, and
wherein the second processor is configured to send back, to the user terminal, the response to the search request, on the basis of the data which has been acquired from the first node as a result of the search request and on which the command relating to the transaction log has been executed.

6. The database system according to claim 1,
wherein the second processor is further configured to:
receive a search request from a user terminal; and
send back, to the user terminal, a response to the search request,
wherein the second processor is configured to expand the data that has been received by the reception unit in accordance with the transmission request, into the second memory, and execute the command relating to the transaction log on the data, and
wherein the second processor is configured to send back, to the user terminal, the response to the search request, on the basis of the data on which the command relating to the transaction log has been executed in accordance with the search request.

7. The database system according to claim 1,
wherein the second processor is configured to execute the command relating to the transaction log on the data in response to the data having been expanded into the second memory.

8. The database system according to claim 1, wherein the first processor is configured to transmit, as the specific identification information, the identification information indicating the newest transaction log, from among the identification information items.

9. The database system according to claim 1, wherein the data is transmitted and received in table units or page units.

10. The database system according to claim 1, wherein the second processor is configured to execute the command relating to the transaction log on the received data, in accordance with the sequence of commands identified from the identification information.

11. An information processing device, comprising:
a storage device;
a memory; and
a processor connected to the storage device and the memory, the processor being configured to:
receive, from another information processing device managing a database, a transaction log of the database, identification information items enabling identification of a sequence of commands relating to the transaction log, specific identification information indicating a transaction log at a predetermined time point, from among the identification information items, and data managed by the database, the data being received respectively in predetermined management units divided so that records of the database having an interdependent sequence of commands relating to the transaction logs are included in a same predetermined management unit;
perform reading of search object data, of a search processing in the database, from the storage device onto the memory, and writing of the search object data from the memory onto the storage device in the predetermined management unit including the search object data;
generate a map indicating a relationship between the predetermined management unit containing the data that is an object of a command, and the contents of the command, on the basis of the transaction log, of the received transaction logs, which is at least newer than the transaction log indicated by the specific identification information;
make the predetermined management unit including search object data among received predetermined management units available for data search, by expanding the predetermined management unit from the storage device into the memory; and
execute a command relating to a transaction log, of the received transaction logs, which is at least newer than the transaction log indicated by the specific identification information and targeting the data included in the predetermined management unit that has been received and expanded into the memory, by referring to the map, until the search processing is executed on the search object data included in the predetermined management unit that has been expanded into the memory.

12. A method for a database system having a plurality of nodes,
wherein a first node which is a replication source of a database, among the plurality of nodes, executes:
holding a transaction log of a database managed by the first node, together with identification information items enabling identification of a sequence of commands relating to the transaction log;
transmitting specific identification information indicating a transaction log at a predetermined time point, from among the identification information items, to a second node which is a replication destination of the database among the plurality of nodes;
transmitting, to the second node, the transaction log and the identification information from at least after the predetermined time point, in association with each other; and
transmitting data managed by the database to the second node, from the predetermined time point onwards, respectively in predetermined management units divided so that records of the database having an interdependent sequence of commands relating to the transaction logs are included in a same predetermined management unit, and
wherein the second node executes:
performing reading of search object data, of a search processing in the database, from the storage device onto a memory, and writing of the search object data from the memory onto a storage device in the predetermined management unit including the search object data;
receiving the transaction log, the identification information of the transaction log, the specific identification information and the data in the predetermined management units, from the first node;
generating a map indicating a relationship between the predetermined management unit containing data that is an object of a command, and the contents of the command, on the basis of the transaction log, of the received transaction logs, which is at least newer than the transaction log indicated by the specific identification information;
making the predetermined management unit including the search object data among received predetermined management units available for data search, by expanding the predetermined management unit from the storage device into the memory; and
executing, when the received data has been expanded into the memory of the second node and is in the state for data search or processing, a command relating to a transaction log, of the received transaction logs, which is at least newer than the transaction log indicated by the specific identification information and targeting the data included in the predetermined management unit that has been expanded into the memory, by referring to the map, until the search processing is executed on the search object data included in the predetermined management unit that has been expanded into the second memory.

13. A computer-readable non-transitory medium on which is recorded a program for a database system having a plurality of nodes,
the program causing a first node which is a replication source of a database, among the plurality of nodes, to:
hold a transaction log of a database managed by the first node, together with identification information items enabling identification of a sequence of commands relating to the transaction log;
transmit specific identification information indicating a transaction log at a predetermined time point, from among the identification information items, to a second node which is a replication destination of the database among the plurality of nodes;
transmit, to the second node, the transaction log and the identification information from at least after the predetermined time point, in association with each other; and
transmit data managed by the database to the second node, from the predetermined time point onwards, respectively in predetermined management units divided so that records of the database having an interdependent sequence of commands relating to the transaction logs are included in a same predetermined management unit, and the program causing the second node to:
  perform reading of search object data, of a search processing in the database, from a storage device onto a memory, and writing of the search object data from the memory onto the storage device in the predetermined management unit including the search object data;
  receive the transaction log, the identification information of the transaction log, the specific identification information and the data in the predetermined management units, from the first node;
  generate a map indicating a relationship between the predetermined management unit containing data that is an object of a command, and the contents of the command, on the basis of the transaction log, of the received transaction logs, which is at least newer than the transaction log indicated by the specific identification information;
  make the predetermined management unit including the search object data among received predetermined management units available for data search, by expanding the predetermined management unit from the storage device into the memory; and
  execute, when the received data has been expanded into the memory of the second node and is in the state available for data search or processing, a command relating to a transaction log, of the received transaction logs, which is at least newer than the transaction log indicated by the specific identification information and targeting the data included in the predetermined management unit that has been expanded into the memory, by referring to the map, until the search processing is executed on the search object data included in the predetermined management unit that has been expanded into the memory.

* * * * *